(12) United States Patent
Yoshida et al.

(10) Patent No.: US 8,329,857 B2
(45) Date of Patent: Dec. 11, 2012

(54) POLYESTER RESIN PARTICLE AND METHOD FOR PRODUCING THE SAME

(75) Inventors: Michiko Yoshida, Yokkaichi (JP); Takeyuki Doi, Yokkaichi (JP); Naoya Maeda, Yokkaichi (JP); Hisashi Kimura, Yokkaichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 519 days.

(21) Appl. No.: 12/301,725

(22) PCT Filed: Aug. 2, 2007

(86) PCT No.: PCT/JP2007/065190
§ 371 (c)(1),
(2), (4) Date: Nov. 20, 2008

(87) PCT Pub. No.: WO2008/016114
PCT Pub. Date: Feb. 7, 2008

(65) Prior Publication Data
US 2009/0263661 A1 Oct. 22, 2009

(30) Foreign Application Priority Data

Aug. 2, 2006 (JP) ................................. 2006-211120
Feb. 26, 2007 (JP) ................................. 2007-045772

(51) Int. Cl.
*C08G 75/02* (2006.01)
*C08G 63/00* (2006.01)

(52) U.S. Cl. ........ 528/499; 528/272; 528/275; 528/282; 528/283

(58) Field of Classification Search .................. 528/499, 528/275, 282, 283
See application file for complete search history.

(56) References Cited

U.S. PATENT DOCUMENTS

| | | | | |
|---|---|---|---|---|
| 3,014,011 | A | * | 12/1961 | Zoetbrood ................... 528/498 |
| 4,238,593 | A | * | 12/1980 | Duh ............................... 528/480 |
| 5,241,046 | A | | 8/1993 | Shiraki et al. |
| 5,270,444 | A | | 12/1993 | Shiraki et al. |
| 5,408,035 | A | | 4/1995 | Duh |
| 5,573,820 | A | | 11/1996 | Harazoe et al. |
| 6,297,315 | B1 | | 10/2001 | Duh et al. |
| 6,461,575 | B1 | | 10/2002 | Duh et al. |
| 7,138,481 | B2 | | 11/2006 | Matsumoto |
| 2003/0109640 | A1 | | 6/2003 | Lee et al. |
| 2004/0176565 | A1 | | 9/2004 | Lee et al. |
| 2005/0239997 | A1 | | 10/2005 | Matsumoto |
| 2008/0182963 | A1 | | 7/2008 | Kimura et al. |
| 2008/0207868 | A1 | | 8/2008 | Kimura et al. |

FOREIGN PATENT DOCUMENTS

| | | |
|---|---|---|
| EP | 1 876 001 A1 | 1/2008 |
| GB | 836742 | 2/1958 |
| JP | 55-13715 | 1/1980 |
| JP | 56-55426 | 5/1981 |
| JP | 59-25815 | 2/1984 |
| JP | 1-180309 | 7/1989 |
| JP | 7 233248 | 9/1995 |
| JP | 7-233248 | 9/1995 |
| JP | 7-286046 | 10/1995 |
| JP | 08-253563 | * 4/1996 |
| JP | 8 253563 | 10/1996 |
| JP | 2001-131267 | 5/2001 |
| JP | 2002 544303 | 12/2002 |
| JP | 2004-67964 | 3/2004 |
| JP | 2004 67964 | 3/2004 |
| JP | 2004-224867 | 8/2004 |
| JP | 2004-323677 | 11/2004 |
| JP | 2004 339410 | 12/2004 |
| JP | 2005 510604 | 4/2005 |
| JP | 2005-350507 | 12/2005 |
| JP | 2006-199830 | 8/2006 |
| WO | 03-106532 | 12/2003 |
| WO | 2006-118209 | 11/2006 |
| WO | 2007-026838 | 3/2007 |
| WO | 2007 026838 | 3/2007 |
| WO | 2007-026841 A1 | 3/2007 |

OTHER PUBLICATIONS

Werther et al. Modelling of Fluidized Bed Reactors, International Journal of Chemical Reactors Engineering, 2003,vol. 1.*
US 5,219,984, 06/1993, Shiraki et al. (withdrawn).
Japanese Office Action, Jul. 17, 2010, Issued in Corresponding Japanese Application 2007-200993.
Japanese Office Action, Oct. 12, 2010, Issued in Corresponding Japanese Application 2007-200993.

* cited by examiner

*Primary Examiner* — Ling Choi
*Assistant Examiner* — Gennadiy Mesh
(74) *Attorney, Agent, or Firm* — Oblon, Spivak, McClelland, Maier & Neustadt, L.L.P.

(57) ABSTRACT

The present invention provides a method for producing a polyester resin, comprising carrying out a hot-water treatment and a heat treatment, in this order, of polyester prepolymer particles obtained by melt polycondensation of a dicarboxylic acid component and a diol component. The hot-water treatment comprises bringing the polyester prepolymer particles with an intrinsic viscosity of from at least 0.10 dL/g to at most 1.0 dL/g and with a density of at most 1.36 g/cm³ into contact with hot water at a temperature higher than the glass transition temperature of the polyester prepolymer particles and less than 100° C., under the condition satisfying the following formula (1):

$$40 \leq (T-Tg)t \leq 6000 \qquad (1)$$

wherein t is a hot-water treatment time (second), T is the temperature of the hot water (° C.) and Tg is the glass transition temperature (° C.) of the polyester prepolymer particles.

9 Claims, 2 Drawing Sheets

POLYESTER RESIN PARTICLE AND METHOD FOR PRODUCING THE SAME

TECHNICAL FIELD

The present invention relates to polyester resin particles and their production method. More particularly, the present invention relates to polyester resin particles and their production method, which permit suppression of fusion of particles in a heat treatment such as crystallization or solid-phase polycondensation and provision of a highly-transparent polyester resin molded product.

Furthermore, the present invention relates to a method for producing polyethylene terephthalate (which will be sometimes abbreviated hereinafter as "PET") with a high molecular weight, by suppressing fusion of particles in a heat treatment during a solid-phase polycondensation reaction based on stepwise heating of a polyethylene terephthalate prepolymer with a low molecular weight under specific conditions.

BACKGROUND ART

Polyester resins are widely used as materials, e.g., for fibers, textiles, resins for molding and beverage bottles. In order to bring out molding processability and mechanical properties necessary for various applications, there is a technique of raising a polycondensation degree of the polyester resin (which is usually expressed by a molecular weight or an intrinsic viscosity) to a predetermined level. A known method therefor is, for example, a method of obtaining a prepolymer of polyester resin (which will be sometimes abbreviated hereinafter as a "polyester prepolymer") by melt polycondensation, particulating the prepolymer, and raising the polycondensation degree by solid-phase polycondensation. Such a method is widely used in production of polyester resin particles on an industrial scale.

In this method, it is common practice to carry out a crystallization step and a drying step to suppress fusion and hydrolysis of particles, before subjecting the polyester prepolymer particles to the solid-phase polycondensation step. Since the polyester prepolymer particles might undergo fusion to bond to each other in the crystallization step and the drying step, various improvement methods have been proposed to avoid such fusion. For example, one of the proposals is a method in which polyester prepolymer particles are immersed in warm water at a temperature at least 10° C. lower than the glass transition temperature (Tg) thereof and in which the temperature is raised to a temperature 15° C. higher than Tg at a rate of below 100° C. per hour with water running at or over a specific linear velocity, thereby avoiding the fusion (cf. Patent Document 1). Other proposed methods include a method for treating polyester prepolymer particles with heated steam at 110° C. or higher before the drying step (cf. Patent Document 2) and a method for treating polyester prepolymer particles with water or steam at a temperature of from 80° C. to 100° C. for from 5 minutes to 25 minutes (cf. Patent Document 3).

On the other hand, mainly for the purpose of improvement in quality of polyester resin and molded products thereof, there are also proposed methods of bringing polyester resin particles into contact with water to reduce oligomers, acetaldehyde, and so on (cf. Patent Documents 4, 5 and 6).

Moreover, by virtue of excellent properties such as mechanical strength and chemical stability, PET is widely used for many materials and products, e.g., fibers, textiles, resins for molding and beverage bottles. Required molecular weights (intrinsic viscosities) of PET differ depending on the applications, and are, for example, usually from 0.70 to 0.95 dL/g for bottles and usually from 0.95 to 1.20 dL/g for tire cords.

In order to bring out the molding processability and mechanical properties necessary for the above-mentioned applications, it is necessary to increase the molecular weight (intrinsic viscosity) to a predetermined level, and a technique therefor widely used on an industrial scale is a method in which a PET prepolymer obtained by melt polycondensation of raw materials for polyethylene terephthalate is sequentially subjected to solid-phase polycondensation to increase the molecular weight. The solid-phase polycondensation is usually conducted by heating the PET prepolymer obtained by the melt polycondensation, in an inert gas atmosphere or under a reduced pressure, but it takes a relatively long period of time before achievement of a desired molecular weight. Therefore, there are desires for a production method with better productivity. A method proposed therefor is one in which a PET prepolymer with a relatively low polymerization degree is obtained by melt polycondensation and in which the prepolymer is subjected to solid-phase polycondensation at a high temperature.

However, the problem of fusion among PET prepolymer particles is likely to arise during the high-temperature solid-phase polycondensation. Heretofore, no sufficient study has been, however, conducted on the fusion.

For example, Patent Document 7 discloses a heat treatment step using two or more continuous moving beds in the solid-phase polycondensation step. The technique disclosed in Patent Document 7 is to raise the temperature stepwise so as to avoid the fusion of particles in the solid-phase polycondensation of PET prepolymer particles with medium molecular weights in the intrinsic viscosity range of about from 0.5 to 0.65 dL/g, but the polycondensation reaction rate is not necessarily improved. Furthermore, a melt polycondensation equipment for obtaining the prepolymer with the medium molecular weights was more expensive than an equipment for obtaining a low-molecular weight prepolymer and the method was not necessarily satisfactory from the overall viewpoint.

Patent Document 1: JP-A-1-180309
Patent Document 2: JP-A-59-25815
Patent Document 3: British Patent 836,742
Patent Document 4: JP-A-7-233248
Patent Document 5: JP-A-7-286046
Patent Document 6: JP-A-2004-67964
Patent Document 7: U.S. Pat. No. 5,408,035

DISCLOSURE OF THE INVENTION

Objects to be Accomplished by the Invention

However, the method described in Patent Document 1 had a problem that the method was not suitable for an operation on an industrial scale because the facility became large-scale and a long period of time was required for the treatment. The method described in Patent Document 2 had a problem that the polycondensation rate decreased in the solid-phase polycondensation step, and the method described in Patent Document 3 had problems that fusion among particles occurred immediately after taking out the particles from hot water and that the solid-phase polycondensation rate decreased.

On the other hand, Patent Documents 4, 5 and 6 describe nothing about prevention of the fusion among polyester prepolymer particles, and the treatments described therein are not suitable for an operation on an industrial scale because the hot-water treating periods described are as long as at least 30 minutes.

Furthermore, there was another problem that the polyester prepolymer particles treated by such treatments decreased their solid-phase polycondensation rate.

In view of these problems, an object of the present invention is to provide a technique for producing polyester resin particles capable of providing a highly transparent molded product by thermoforming, while suppressing the fusion of polyester prepolymer particles during a heat treatment thereof such as crystallization or solid-phase polycondensation, without reduction in the solid-phase polycondensation rate.

Another object of the present invention is to provide an industrially useful production method permitting efficient production of polyethylene terephthalate with a higher molecular weight, by heating polyethylene terephthalate prepolymer particles with a relatively low molecular weight to bring about solid-phase polycondensation at a large polycondensation rate, without occurrence of the fusion among the particles.

Means to Accomplish the Objects

The inventors of the present invention conducted intensive and extensive studies and found that in production of polyester resin particles, when polyester prepolymer particles with an intrinsic viscosity and a density in specific ranges were subjected to a specific hot-water treatment, the fusion could be suppressed during the crystallization in the subsequent heating treatment, and that when a polyester prepolymer crystallized through the hot-water treatment and the heat treatment was subjected to a specific heat treatment to undergo solid-phase polycondensation, we could obtain a polyester resin capable of providing a molded product with high transparency by thermoforming.

Furthermore, the inventors of the present invention found that crystallized polyester prepolymer particles with a surface-crystallized layer containing fine spherocrystals in a specific thickness were unlikely to undergo fusion in the heat treatment and that polyester resin particles with a surface-crystallized layer containing fine spherocrystals in a specific thickness were likely to provide a molded product with excellent transparency by thermoforming.

Yet furthermore, the inventors of the present invention conducted detailed studies on conditions for the heat treatment in a solid state and found that polyethylene terephthalate with a high molecular weight was produced more stably than by the conventional methods; namely, we found that when the process included conducting a "crystallization step" and a "first solid-phase polycondensation step" in this order and setting temperature conditions and time conditions for the crystallization step and the first solid-phase polycondensation step in specific ranges, resistance to the fusion after the first solid-phase polycondensation step was improved.

The present invention has been accomplished based on the above findings and has the following.

1. A method for producing a polyester resin, comprising carrying out a hot-water treatment and a heat treatment, in this order, of polyester prepolymer particles obtained by melt polycondensation of a dicarboxylic acid component and a diol component,
wherein the hot-water treatment comprises bringing the polyester prepolymer particles with an intrinsic viscosity of from at least 0.10 dL/g to at most 1.0 dL/g and with a density of at most 1.36 g/cm³ into contact with hot water having a temperature higher than the glass transition temperature of the polyester prepolymer particles and less than 100° C., under the condition satisfying the following formula (1):

$$40 \leq (T-Tg)t \leq 6000 \quad (1)$$

wherein t is a hot-water treatment time (second), T is the temperature of the hot water (° C.) and Tg is the glass transition temperature (° C.) of polyester prepolymer particles.

2. The method for producing the polyester resin according to the above 1, wherein the polyester prepolymer particles are those obtained by the melt polycondensation in the presence of a polycondensation catalyst containing a titanium compound and/or a germanium compound.

3. The method for producing the polyester resin according to the above 1 or 2, wherein the polyester prepolymer particles are particles with an average particle size of from at least 0.5 mm to at most 10 mm.

4. The method for producing the polyester resin according to any one of the above 1 to 3, wherein the hot-water treatment time t (second) is from at least one second to at most 300 seconds.

5. The method for producing the polyester resin according to any one of the above 1 to 4, wherein the heat treatment is conducted at a temperature of from at least 120° C. to at most 245° C.

6. The method for producing the polyester resin according to any one of the above 1 to 5, wherein the heat treatment comprises a crystallization step, thereby yielding crystallized polyester prepolymer particles with a surface-crystallized layer having a thickness of from at least 15 µm to at most 110 µm and with an intrinsic viscosity of from at least 0.10 dL/g to at most 1.0 dL/g.

7. The method for producing the polyester resin according to any one of the above 1 to 6, wherein the heat treatment comprises a solid-phase polycondensation step, thereby yielding polyester resin particles with a surface-crystallized layer having a thickness of from at least 15 µm to at most 110 µm and with an intrinsic viscosity of from at least 0.60 dL/g to at most 1.5 dL/g.

8. The method for producing the polyester resin according to any one of the above 1 to 7, wherein the heat treatment comprises a crystallization step and a solid-phase polycondensation step in this order.

9. The method for producing the polyester resin according to the above 8, wherein the crystallization step yields crystallized polyester prepolymer particles with a surface-crystallized layer having a thickness of from at least 15 µm to at most 110 µm and with an intrinsic viscosity of from at least 0.10 dL/g to at most 0.40 dL/g, and wherein the solid-phase polycondensation step yields polyester resin particles with a surface-crystallized layer having a thickness of from at least 15 µm to at most 110 µm and with an intrinsic viscosity of from at least 0.60 dL/g to at most 1.5 dL/g.

10. The method for producing the polyester resin according to the above 9, wherein a terminal carboxyl group concentration of the polyester prepolymer particles is at most 50 eq/ton.

11. A crystallized polyester prepolymer particle with a surface-crystallized layer having a thickness of from at least 15 µm to at most 110 µm and with an intrinsic viscosity of from at least 0.10 dL/g to at most 1.0 dL/g.

12. A polyester resin particle with a surface-crystallized layer having a thickness of from at least 15 µm to at most 110 µm and with an intrinsic viscosity of from at least 0.60 dL/g to at most 1.5 dL/g.

13. A method for producing a polyester resin, using a polyethylene terephthalate prepolymer as a polyester prepolymer and comprising a heat treatment in a solid state, wherein the heat treatment comprises a crystallization step and a first solid-phase polycondensation step in this order and satisfies the following conditions (A) and (B):

(A) the crystallization step comprises a treatment of the polyethylene terephthalate prepolymer, wherein a temperature Tx of the treatment is from at least 110° C. to at most 210° C. and a time θx of the treatment is from at least 3 minutes to at most 30 minutes; and (B) the first solid-phase polycondensation step comprises subjecting the polyethylene terephthalate prepolymer which has gone through the crystallization step, to a process of raising temperature from a temperature not more than the temperature Tx of the treatment in the crystallization step to a reaction temperature T1 in the first solid-phase polycondensation step, in an inert gas atmosphere or under a reduced pressure, wherein the temperature is raised from Tx(° C.) to T1(° C.) within 30 minutes, and wherein a reaction time θ1 at the temperature T1 satisfies the following formulae (2) to (4):

$$Tx+20 \leq T1 \quad (2),$$

$$180° C. \leq T1 \leq 230° C. \quad (3), \text{ and}$$

$$\theta x < \theta 1 \quad (4).$$

14. The method for producing the polyester resin according to the above 13, comprising, prior to the heat treatment in the solid state, a hot-water treatment of bringing the polyester prepolymer into contact with hot water having a temperature higher than the glass transition temperature of the polyester prepolymer and lower than 100° C., under the condition satisfying the following formula (1):

$$40 \leq (T-Tg)t \leq 6000 \quad (1).$$

15. The method for producing the polyester resin according to the above 13 or 14, wherein the heat treatment comprises a temperature rise step after the first solid-phase polycondensation step, wherein the temperature rise step comprises subjecting the polyethylene terephthalate prepolymer which has gone through the crystallization step and the first solid-phase polycondensation step, to a step of raising temperature from a temperature not more than the reaction temperature T1 of the treatment in the first solid-phase polycondensation step to a maximum achieving temperature T2, in an inert gas atmosphere or under a reduced pressure, wherein the temperature is raised from T1(° C.) to (T1+15)(° C.) within 30 minutes, and wherein the temperature T1(° C.) and the temperature T2(° C.) satisfy the following formulae (5) and (6):

$$T1+15 \leq T2 \quad (5) \text{ and}$$

$$205° C. \leq T2 \leq 240° C. \quad (6).$$

16. The method for producing the polyester resin according to the above 15, wherein the heat treatment comprises a second solid-phase polycondensation step after the temperature rise step after the first solid-phase polycondensation step, wherein the second solid-phase polycondensation step comprises a step of subjecting the polyethylene terephthalate prepolymer which has gone through the crystallization step, the first solid-phase polycondensation step and the temperature rise step, to a reaction in an inert gas atmosphere or under a reduced pressure, and wherein a temperature T3 of the reaction is from at least 190° C. to at most 240° C.

17. The method for producing the polyester resin according to any one of the above 6 to 10 and 13 to 16, wherein the crystallization step is conducted in a fluidized bed.

18. The method for producing the polyester resin according to any one of the above 15 to 17, wherein the temperature rise step after the first solid-phase polycondensation step is conducted in a fluidized bed.

19. The method for producing the polyester resin according to any one of the above 13 to 18, wherein an intrinsic viscosity of the polyethylene terephthalate prepolymer to be supplied to the heat treatment is from at least 0.18 dL/g to at most 0.40 dL/g, and wherein an intrinsic viscosity of polyethylene terephthalate obtained by the heat treatment of the polyethylene terephthalate prepolymer in the solid state is at least 0.70 dL/g.

20. The method for producing the polyester resin according to any one of the above 13 to 19, wherein the polyethylene terephthalate prepolymer to be supplied to the heat treatment is in a form of particles with an average mass of from at least 0.1 mg/particle to at most 30 mg/particle.

21. The method for producing the polyester resin according to any one of the above 13 to 20, wherein a terminal carboxyl group concentration of the polyethylene terephthalate prepolymer to be supplied to the heat treatment is at most 100 eq/ton.

22. The method for producing polyethylene terephthalate according to any one of the above 13 to 21, wherein the resulting polyethylene terephthalate contains a titanium compound and/or a tungsten compound.

Effect of the Invention

When polyester resin particles are produced by subjecting polyester prepolymer particles to the hot-water treatment and then to the heat treatment in accordance with the production method of polyester resin of the present invention, the polyester prepolymer particles with the intrinsic viscosity and the density in the specific ranges are subjected to the hot-water treatment under the specific conditions, whereby the fusion among the polyester prepolymer particles is suppressed in the subsequent heat treatments of the polyester prepolymer particles such as crystallization and solid-phase polycondensation. In addition, this hot-water treatment does not cause any considerable reduction in the solid-phase polycondensation rate.

The crystallized polyester prepolymer particles of the present invention, are those in which the fusion is suppressed during the heat treatment and in which no considerable reduction is caused in the solid-phase polycondensation rate. Moreover, use of the polyester resin particles of the present invention permits us to obtain a polyester resin molded product with high transparency.

This is considered to be because a plasticized layer with a high crystallization rate is formed on the outermost layer of the particles by the hot-water treatment under the specific conditions.

Furthermore, according to the present invention, a high-molecular weight PET is efficiently produced by conducting the solid-phase polycondensation of the low-molecular weight PET prepolymer particles obtained by the melt polycondensation at a large polycondensation reaction rate, without fusion thereof.

Namely, the production method of PET of the present invention is a method for efficiently producing PET with a desired high molecular weight suitable for various applications, by subjecting the PET prepolymer particles obtained by the melt polycondensation, to the heat treatment in the solid state, the requirements of which are to conduct the crystallization and solid-phase polycondensation under the predetermined conditions. By conducting the crystallization and solid-phase polycondensation controlled under the predetermined conditions, higher resistance to fusion is achieved in a high molecular weight region than under the conditions as in the conventional methods, i.e., than in a case wherein the crystallization is conducted for at least 30 minutes. Thus, it becomes feasible to improve the productivity and to realize energy saving, e.g., prevention of fusion trouble in the solid-phase polycondensation, while keeping the polycondensation reaction rate.

A PET obtained by the method of the present invention has a high molecular weight and can be used for a wide range of applications such as beverage bottles and fibers for industrial use. Furthermore, the method of the present invention is also economically advantageous because the PET prepolymer with a low molecular weight can be used as a raw material for the solid-phase polycondensation and thus the facility burden can also be reduced in the melt polycondensation step for producing the low-molecular weight PET prepolymer.

MEANS OF SYMBOLS

Figure 1:
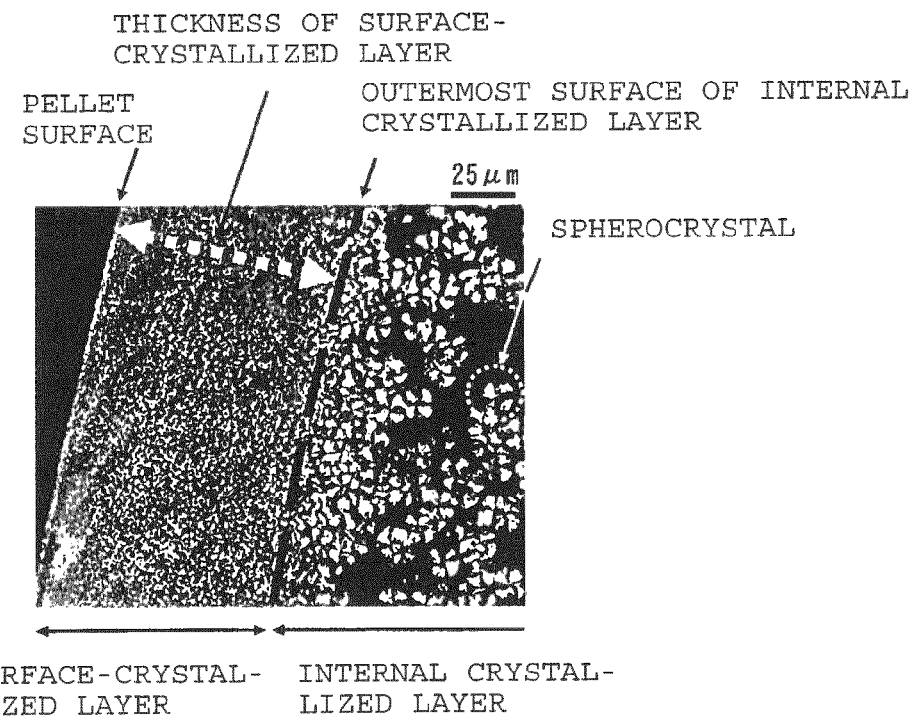
FIG. 1 is a drawing to show a trans-crystal layer and an internal crystallized layer of an ordinary crystallized polyester prepolymer particle.

| 1: | heat treatment tube |
|---|---|
| 2: | gas flowmeter |
| 3: | nitrogen introduction tube |
| 4: | nitrogen preheating tube |
| 5: | oil bath |
| 6: | dispersing plate |
| 7: | sample layer |
| 8: | filter |
| 9: | gas purge opening |
| 10: | branched tube |
| 11: | thermocouple |
| 12: | thermometer |
| 21: | heat treatment tube |
| 22: | gas flowmeter |
| 23: | nitrogen introduction tube |
| 24: | nitrogen preheating tube |
| 25: | oil bath |
| 26: | dispersing plate |
| 27: | sample layer |
| 28: | filter |
| 29: | gas purge opening |
| 30: | metallic mesh |
| 31: | support |
| 32: | pin |
| 33: | pedestal |

BEST MODE FOR CARRYING OUT THE INVENTION

Embodiments of the present invention will be explained below in detail.

It is noted that in the present invention a polyester obtained by melt polymerization detailed below is called a "polyester prepolymer," particles obtained by particulation of the polyester prepolymer are called "polyester prepolymer particles," particles resulting from crystallization of the polyester prepolymer particles are called "crystallized polyester prepolymer particles," and crystallized polyester particles with an intrinsic viscosity of at least 0.60 dL/g are called "polyester resin particles." However, the term "polyester" or "polyester resin" will be sometimes omitted from the designations in use.

Production of Polyester Prepolymer Particles

There are no particular restrictions on the dicarboxylic acid component and diol component as raw materials for the polyester prepolymer and polyester resin used in the present invention, and any components can be used. Among others, the dicarboxylic acid component is preferably one composed mainly of terephthalic acid and its derivative, and the diol component is preferably one composed mainly of ethylene glycol. Here, the term "composed mainly of" means, for example, a rate thereof in the dicarboxylic acid component or in the diol component is at least 90 mol %, and the rate is preferably at least 95 mol % and particularly preferably at least 99 mol %.

The derivative of terephthalic acid is, for example, an ester-forming derivative, and specific examples thereof include alkyl esters of terephthalic acid in which each alkyl has about from 1 to 4 carbon atoms, such as dimethyl ester of terephthalic acid; halides such as terephthalic acid dichloride; and so on.

Furthermore, in preparation of the polyester prepolymer or the polyester resin used in the present invention, the raw materials may contain another copolymerization component such as dicarboxylic acid component other than terephthalic acid or diol component other than the ethylene glycol component as long as the effect of the present invention is not impaired. In general, an amount of such other copolymerization components is preferably at most 10 mol % to the entire polyester resin obtained, and is particularly preferably at most 5 mol %.

Examples of the dicarboxylic acid component other than terephthalic acid or its derivatives include aromatic dicarboxylic acids such as phthalic acid, isophthalic acid, 1,3-phenylenedioxydiacetic acid, 4,4'-diphenyldicarboxylic acid, 4,4'-diphenyl etherdicarboxylic acid, 4,4'-diphenyl ketonedicarboxylic acid, 4,4'-diphenoxyethanedicarboxylic acid, 4,4'-diphenyl sulfonedicarboxylic acid and 2,6-naphthalenedicarboxylic acid, and ester-forming derivatives of the aromatic dicarboxylic acids such as alkyl esters thereof in which each alkyl has about from 1 to 4 carbon atoms, and halides thereof; alicyclic dicarboxylic acids such as hexahydroterephthalic acid, and ester-forming derivatives of the alicyclic dicarboxylic acids such as alkyl ethers thereof in which each alkyl has about from 1 to 4 carbon atoms, and halides thereof; aliphatic dicarboxylic acids such as succinic acid, glutaric acid, adipic acid, pimelic acid, suberic acid, azelaic acid, sebacic acid, undecanedicarboxylic acid and dodecanedicarboxylic acid, and ester-forming derivatives of the aliphatic dicarboxylic acids such as alkyl esters thereof in which each alkyl has about from 1 to 4 carbon atoms, and halides thereof; and so on.

Examples of the diol component other than ethylene glycol include aliphatic diols such as diethylene glycol, triethylene glycol, trimethylene glycol, tetramethylene glycol, hexamethylene glycol, decamethylene glycol, neopentyl glycol, 2-ethyl-2-butyl-1,3-propanediol, polyethylene glycol and polytetramethylene ether glycol; alicyclic diols such as 1,4-cyclohexanediol and 1,4-cyclohexanedimethylol; aromatic diols such as xylene glycol; ethylene oxide adducts and propylene oxide adducts of 2,2-bis(4'-hydroxyphenyl) propane; and so on.

Furthermore, examples of the copolymerization components other than the dicarboxylic acid component and the diol component as described above include monofunctional components such as stearyl alcohol, stearic acid, and benzoic acid, polyfunctional components with a functionality of at least 3, such as trimellitic acid, trimesic acid, pyromellitic acid, trimethylolethane, trimethylolpropane, glycerol and pentaerythritol, and so on.

There are no particular restrictions on a production method of the polyester prepolymer particles supplied to the hot-water treatment in the present invention, and any conventionally known method can be used, for example. The polyester prepolymer used for the polyester prepolymer particles in the present invention is obtained by melt polycondensation of the dicarboxylic acid component and the diol component, and, for example, the polyester prepolymer is obtained by subjecting the dicarboxylic acid component such as terephthalic acid or an ester-forming derivative thereof and the diol component such as ethylene glycol to an esterification or transesterification reaction, and then subjecting the resultant to a melt polycondensation reaction in the presence of a polycondensation catalyst.

An example of the method for producing the polyester prepolymer is a method in which the dicarboxylic acid composed mainly of terephthalic acid or a derivative thereof, and the diol composed mainly of ethylene glycol are subjected to an esterification reaction in an esterification reaction vessel under stirring, normally, under a temperature condition of about from 240 to 280° C., and, normally under a pressure of from the ordinary pressure to about 0.5 MPa for about from 1 to 10 hours. In this case, a molar ratio of the diol component to the dicarboxylic acid component is usually at least 1 and particularly preferably at least 1.05, and usually preferably at most 1.6 and particularly preferably at most 2.

Another production method may be a method in which the dicarboxylic acid component and the diol component are subjected to a transesterification reaction in the presence of a transesterification catalyst, and in which the resulting esterification product or a polyester low-molecular weight product obtained as a transesterification product is then transferred into a polycondensation vessel and subjected to melt polycondensation in the presence of a polycondensation catalyst under stirring, normally, at a temperature of about from 250 to 290° C. and under a pressure condition of starting from the ordinary pressure, reducing the pressure gradually, and finally keeping the pressure, normally, at about from 1333 to 13.3 Pa for about from 1 to 20 hours.

The production methods described above may be conducted in a continuous or batch-wise manner, and each of the esterification reaction vessel and the polycondensation vessel may be a single-stage or multistage vessel.

The esterification reaction may be conducted in the presence or absence of a catalyst, and it is optionally decided in accordance with production conditions and others. Examples of the esterification reaction catalyst include conventionally known catalysts, e.g., germanium compounds such as germanium dioxide, germanium tetroxide, germanium hydroxide, germanium oxalate, germanium tetraethoxide and germanium tetra-n-butoxide; antimony compounds such as antimony trioxide, antimony pentoxide, antimony acetate and antimony tris(ethylene glycoxide); titanium compounds such as titanium tetraethoxide, titanium tetra-n-propoxide, titanium tetra-i-propoxide, titanium tetra-n-butoxide, titanium oxalate and titanium potassium oxalate; and tungsten compounds such as tungsten trioxide, paratungstic acid, metatungstic acid, tungstic acid, silicotungstic acid, phosphotungstic acid and salts thereof. They can be used singly or in combination of two or more compounds.

One or more kinds of conventionally known compounds of metals such as titanium, tungsten, magnesium, calcium, manganese, lithium and zinc can be used as the transesterification reaction catalyst. Specific examples of the catalyst include organic acid salts, alcoholates, carbonates, and the like of these metals, and among others, the catalyst is preferably one of magnesium acetate, calcium acetate, manganese acetate, lithium acetate, hydrates of these compounds, and the like. They can be used singly or in combination of two or more compounds.

Examples of the polycondensation catalyst of polyester include germanium compounds such as germanium dioxide, germanium tetroxide, germanium hydroxide, germanium oxalate, germanium tetraethoxide and germanium tetra-n-butoxide; titanium compounds such as titanium alkoxides, e.g., titanium tetraethoxide, titanium tetra-n-propoxide, titanium tetra-i-propoxide and titanium tetra-n-butoxide, titanium oxalate and titanium potassium oxalate; tungsten compounds such as tungsten trioxide, paratungstic acid, metatungstic acid, tungstic acid, silicotungstic acid, phosphotungstic acid and salts thereof; cobalt compounds such as cobalt formate, cobalt acetate, cobalt stearate, cobalt oxalate, cobalt carbonate and cobalt bromide; tin compounds such as tin acetate, tin oxalate and tin bromide; and the like. These may be used singly or in combination of two or more compounds at an optional ratio, and, among others, the titanium compound and/or germanium compound is preferably used in terms of a large polycondensation rate; the titanium compound is particularly preferably used for the following reasons: the polycondensation rate is large, the environment load is less, an amount of a by-product such as acetaldehyde is reduced, a crystallization rate of the polyester prepolymer is kept small, and the effect of the present invention becomes prominent. Titanium alkoxides are particularly preferable in terms of availability and handling efficiency.

An amount of the catalyst used in the polycondensation reaction of polyester is usually preferably about from 1 to 500 mass ppm, more preferably from 2 to 300 mass ppm, to the polyester obtained, based on the content of the metal atom derived from the catalyst. If the amount of the catalyst is too small, the polycondensation reaction might not proceed. On the other hand, if the amount of the catalyst is too large, a side reaction might occur to cause coloring or the like.

A phosphorus compound may be used as a stabilizer in the esterification reaction and/or the transesterification reaction, and in the polycondensation reaction.

Examples of the phosphorus compound include phosphoric esters such as trimethyl phosphate, triethyl phosphate, tri-n-butyl phosphate, trioctyl phosphate, triphenyl phosphate and tricresyl phosphate; phosphorous esters such as triphenyl phosphite, trisdodecyl phosphite, and trisnonylphenyl phosphite; acid phosphoric esters such as methyl acid phosphate, ethyl acid phosphate, isopropyl acid phosphate, butyl acid phosphate, dibutyl phosphate, monobutyl phosphate and dioctyl phosphate; phosphoric acid, phosphorous acid, hypophosphorous acid, polyphosphoric acid, and so on. They can be used singly or in combination of two or more compounds.

An amount of the phosphorus compound to be used is usually preferably about from 1 to 200 mass ppm, more preferably from 2 to 100 mass ppm, to the polyester obtained, based on the content of the phosphorus atom derived from the phosphorus compound.

Furthermore, a basic compound may be used as an ether bond formation inhibitor. Examples of the basic compound include tertiary amines such as triethylamine, tri-n-butylamine and benzyldimethylamine; quaternary ammonium hydroxides such as tetraethylammonium hydroxide, tetra-n-butylammonium hydroxide and trimethylbenzylammonium hydroxide; lithium carbonate, sodium carbonate, potassium carbonate, sodium acetate, magnesium acetate, and so on. They are used singly or in combination of two or more compounds.

The polyester prepolymer obtained by the melt polycondensation may be pulled out in the form of strands from a molten state and cut with a cutter under cooling with water or after cooling with water, thereby obtaining polyester prepolymer particles; or molten droplets thereof may be dropped into water, thereby obtaining prepolymer particles. Alternatively, the polyester prepolymer in a molten state may be discharged through die holes into water and cut under cooling with a cutter placed adjacent to a surface of the die holes, thereby obtaining polyester prepolymer particles. Amorphous or low-crystalline particles obtained in this manner are then subjected to dehydration or the like, if necessary, to remove attached water and supplied as polyester prepolymer particles to the subsequent hot-water treatment.

In the present invention, sizes of the polyester prepolymer particles supplied to the hot-water treatment are optionally determined but an average particle size thereof is preferably at least 0.5 mm, more preferably at least 0.6 mm, and preferably at most 10 mm, more preferably at most 8 mm. When the average particle size is within this range, they do not cause the problems that the particles float or scatter into air and that the solid-phase polycondensation rate is decreased, which is preferable.

The average particle size of the polyester prepolymer particles is determined by making a cumulative distribution curve in accordance with the dry sieving test as described in JISK0069, and defining a value at the cumulative percentage of 50% as the average particle size.

Furthermore, the intrinsic viscosity of the polyester prepolymer particles supplied to the hot-water treatment in the present invention is at least 0.10 dL/g, preferably at least 0.15 dL/g, and more preferably at least 0.18 dL/g, and at most 1.0 dL/g and preferably at most 0.90 dL/g. When the intrinsic viscosity is within this range, the polyester prepolymer particles are easily obtained from the polyester prepolymer in the molten state and the effect of the present invention is significant.

In the production method of the polyester prepolymer described above, the intrinsic viscosity of the polyester prepolymer particles can be set in a predetermined range by optionally selecting a kind and an amount of the catalyst, or the temperature, pressure, residence time and so on in the melt polycondensation reaction.

In the present invention, the intrinsic viscosity is determined as follows. About 0.25 g of a sample is put in about 25 ml of a mixed solvent of phenol/1,1,2,2-tetrachloroethane (mass ratio: 1/1), and dissolved to a concentration of $1.00 \times 10^{-2}$ kg/l at 110° C. in 30 minutes for the amorphous polyester prepolymer or at 140° C. in 30 minutes for the polyester prepolymer or polyester after the heat treatment, and the resulting solution was cooled to 30° C. Thereafter, the number of seconds for dropping of each of the sample solution in the concentration of $1.00 \times 10^{-2}$ kg/l and the solvent alone is measured with an automatic solution viscometer ("2CH model DJ504" manufactured by SENTEC Corporation Limited) and the intrinsic viscosity is calculated according to the following formula.

$$IV = [(1 + 4K_H \eta_{sp})^{0.5} - 1]/(200 K_H C)$$

In this equation, $\eta_{sp} = \eta/\eta_0 - 1$, $\eta$ is the number of seconds for dropping of the sample solution, $\eta_0$ is the number of seconds for dropping of the solvent, C is the concentration of the polymer solution (kg/l) and $K_H$ is the Huggins constant. $K_H$ adopted herein was 0.33.

In addition, the density of the polyester prepolymer particles supplied to the hot-water treatment in the present invention is at most 1.36 g/cm$^3$ and preferably at most 1.35 g/cm$^3$. If the density exceeds 1.36 g/cm$^3$, it is difficult to form a surface-crystallized layer detailed below and the effect of the present invention is unlikely to be obtained, which is not preferable. Here, the lower limit of the density is usually 1.30 g/cm$^3$.

When the polyester prepolymer particles are obtained from the polyester prepolymer, the density of the polyester prepolymer particles can be set in a predetermined range, for example, by a method of controlling a temperature of the cooling water, or a contact time of the polyester prepolymer with the cooling water, or by a method of adjusting a cooling efficiency with the cooling water by control of the particle sizes of the polyester prepolymer particles.

In the present invention, the density is determined by precisely weighing from 6 to 8 g of a sample in a measurement cell and measuring the density thereof at a measurement temperature of 23° C. with a dry-type automatic densimeter ("Accupyc1330" manufactured by SHIMADZU CORPORATION).

Hot-Water Treatment

In the present invention, the hot-water treatment is conducted in such a manner that the polyester prepolymer particles with the intrinsic viscosity of from at least 0.10 dL/g to at most 1.0 dL/g and with the density of at most 1.36 g/cm$^3$ produced as described above are brought into contact with hot water at a temperature T higher than the glass transition temperature Tg of the polyester prepolymer particles and less than 100° C., under the condition satisfying the following formula (1):

$$40 \leq (T - Tg)t \leq 6000 \tag{1}$$

wherein t is a hot-water treatment time (second), T is the temperature of the hot water (° C.) and Tg is the glass transition temperature (° C.) of the polyester prepolymer particles.

Here, the reason why the effect of the present invention is obtained is considered as follows. When the hot-water treatment is conducted under the specific condition according to the present invention, only the surface of the polyester prepolymer particles is plasticized to enhance alignment of an amorphous portion and to promote formation of fine crystalline nuclei. Furthermore, when the subsequent heat treatment is conducted, the amorphous layer plasticized to enhance the alignment is crystallized to form a surface-crystallized layer having spherocrystals about from 10 to 100 times more than in an ordinary crystallized layer, on the surface of the particles, whereby a crystallization rate of the surface-crystallized layer becomes extremely large to suppress "stickiness" of the amorphous portion with increase in temperature. It is considered herein that when the parameter ((T−Tg)t) corresponding to the total amount of heat supplied to the prepolymer particles in the hot-water treatment is set in an appropriate range, the thickness of the plasticized amorphous layer falls within a specific range and that when the thickness of the surface-crystallized layer formed in the subsequent heat treatment is set in an optimum range, reduction of the solid-phase polycondensation reaction rate can be controlled without substantially preventing a by-product produced in the solid-phase polycondensation, from going out of the particles.

The temperature T(° C.) of the hot water used in the hot-water treatment of the present invention is less than 100° C. and more preferably at most 95° C. The lower limit of the hot-water treatment temperature T(° C.) is preferably higher than the glass transition temperature (Tg) of the polyester prepolymer particles and, among others, it is more preferably at least 1° C. higher than Tg, particularly preferably at least 5° C. higher than Tg; specifically, the lower limit of the temperature of the hot water is preferably 60° C. and particularly preferably 65° C.

When the treatment is conducted with hot water at a temperature of at most Tg of the polyester prepolymer particles, a long period of time is required for the hot-water treatment in order to suppress the fusion among particles in the drying step and in the crystallization step of the subsequent heat treatment, and the effect of the present invention tends to be achieved unlikely. On the other hand, a treatment with hot water or steam at a temperature of at least 100° C. is not preferable because it can cause deactivation of the catalyst and result in decrease of the solid-phase polycondensation rate.

The glass transition temperature Tg of the polyester prepolymer particles is determined as follows. A differential scanning calorimeter is used to obtain a calorimetric curve with a rise in temperature from room temperature to 300° C. at a temperature rise rate of 20° C./min. Tg is defined as a temperature at an intersection between a tangent line to the curve at a middle point of a change of the specific heat caused by the glass transition and a tangent line to the curve at a point prior to the change of the specific heat.

In the above formula (1) which is a relational expression among the hot-water treatment time t (second), hot-water temperature T(° C.) and the glass transition temperature Tg(° C.) of the polyester prepolymer particles in the hot-water treatment of the present invention, "(T−Tg)t" is the parameter corresponding to the total amount of heat supplied to the particles, and the lower limit thereof is 40, preferably 80 and more preferably 100, while the upper limit thereof is 6000, preferably 4000, more preferably 2000 and particularly preferably 1000.

If "(T−Tg)t" is less than 40, the heat quantity supplied to the polyester prepolymer particles is insufficient and formation of the surface-crystallized layer becomes insufficient, whereby the fusion suppression effect cannot be achieved. On the other hand, the range of "(T−Tg)t" over 6000 is not preferable because the solid-phase polycondensation rate might be decreased.

The hot-water treatment time t (second) is at least one second, preferably at least 5 seconds, and at most 300 seconds, preferably at most 250 seconds. This range is particularly preferable because the effect of the hot-water treatment according to the present invention is obtained with use of a relatively small-scale apparatus and implementation on an industrial scale becomes easier.

Specific methods of the hot-water treatment of the present invention include a method wherein particles obtained by strand-cutting the polyester prepolymer in the form of strands pulled out from a melt polycondensation vessel of the polyester prepolymer are brought into contact with hot water in a pipe for transportation of the particles to the dehydration step or in a tank provided on the way to the dehydration step, and a method wherein polyester prepolymer particles from which attached water was once removed after particulation are introduced into a hot-water treatment vessel to be brought into contact with hot water.

Heat Treatment

In the present invention, the polyester prepolymer particles after the above-mentioned hot-water treatment are then subjected to the heat treatment.

In the present invention, the heat treatment includes a drying step, a temperature-raising step, a crystallization step, a solid-phase polycondensation step, and so on, and refers to a step of treating polyester prepolymer particles in a solid state under a temperature condition over an ordinary temperature.

The lower limit of the temperature in the heat treatment is normally 120° C., preferably 125° C., and the upper limit thereof is normally 245° C., preferably 240° C. This heat-treatment temperature may be optionally selected as a preferable temperature depending on an object of the heat treatment or the temperature may be changed stepwise.

In the heat treatment of the polyester prepolymer particles after the hot-water treatment, the particles may be subjected to solid-phase polycondensation to form polyester resin particles with a desired polycondensation degree. In the solid-phase polycondensation, the polyester prepolymer particles after the hot-water treatment step are usually crystallized and dried, and then the solid-phase polycondensation is conducted. Here, the drying may be conducted simultaneously with the crystallization.

The crystallization is usually conducted with the particles being heated under stirring or under fluidization. The crystallization temperature is usually at least 120° C., preferably at least 130° C., and at most 200° C., preferably at most 190° C.; the retention time is usually from 1 to 60 minutes, and preferably from 3 to 30 minutes. The temperature and time in the crystallization are further preferably within these ranges because the fusion is unlikely to occur among particles and an adequate crystallization degree is achieved in a relatively short period of time. Moreover, they are further preferable because the fusion tends to occur unlikely when the drying if needed, the solid-phase polycondensation, or the like is conducted.

The crystallization step is a step of crystallizing at least a part of the polyester prepolymer substantially in an amorphous state.

After the crystallization, the crystallized polyester prepolymer particles are dried if necessary. The drying is conducted at a temperature of at least 140° C. and at most 190° C., preferably at least 145° C. and at most 180° C., and preferably under circulation of an inert gas such as nitrogen or argon. The drying time is usually from 30 minutes to 6 hours and preferably from 40 minutes to 4 hours. The temperature and time in the drying are further preferably within these ranges because the drying can be conducted in a relatively short period of time and hydrolysis or the like is unlikely to occur.

Solid-phase polycondensation is further conducted as occasion demands. The temperature of the solid-phase polycondensation may be appropriately selected from the conventionally known temperature range, and it is generally at least 190° C., preferably at least 195° C. and at most 245° C., preferably at most 240° C. The pressure of the solid-phase polycondensation atmosphere is usually at least the atmospheric pressure, and at most a pressure 100 kPa higher than the atmospheric pressure, preferably at most a pressure 20 kPa higher than the atmospheric pressure when it is conducted in an inert gas atmosphere such as nitrogen, argon or carbon dioxide. Furthermore, when it is conducted under a reduced pressure atmosphere, the absolute pressure is usually from 0.01 to 2 kPa, and preferably from 0.03 to 1 kPa.

The solid-phase polycondensation time is usually from 1 to 30 hours and preferably from 5 to 25 hours though desired properties can be attained in a shorter period of time as the temperature becomes higher.

The temperature and pressure are appropriately selected so as to obtain the polyester resin particles with a desired polycondensation degree.

In the present invention, the heat treatment preferably comprises the crystallization step and the solid-phase polycondensation step in this order; it is preferable to obtain the crystallized polyester prepolymer particles with the surface-crystallized layer and the intrinsic viscosity described below in the crystallization step and to obtain the polyester resin particles with the surface-crystallized layer and the intrinsic viscosity described below in the solid-phase polycondensation step.

Crystallized Polyester Prepolymer Particles·Polyester Resin Particles

Now, the crystallized polyester prepolymer particles of the present invention and the polyester resin particles of the present invention (which will be sometimes collectively called hereinafter "particles of the present invention") will be explained.

The intrinsic viscosity of the crystallized polyester prepolymer particles of the present invention is at least 0.10 dL/g, preferably at least 0.15 dL/g, further preferably at least 0.18 dL/g, and at most 1.0 dL/g, preferably at most 0.90 dL/g.

Furthermore, the intrinsic viscosity of the polyester resin particles of the present invention is at least 0.60 dL/g, preferably at least 0.65 dL/g, further preferably at least 0.68 dL/g, and at most 1.5 dL/g, preferably at most 1.4 dL/g.

The intrinsic viscosity of the particles of the present invention is usually within the range, and the effect of the present invention is significant as long as the intrinsic viscosity is within the range.

Generally speaking, when polyester particles are crystallized, a transcrystal layer is formed in a thickness of about 10 µm on the outermost surface thereof and the other portion becomes a crystalline layer with spherocrystals of a diameter usually in a range of about from 5 to 100 µm (which is called as "internal crystalline layer" in the present invention) (cf. FIG. 1).

Figure 2:
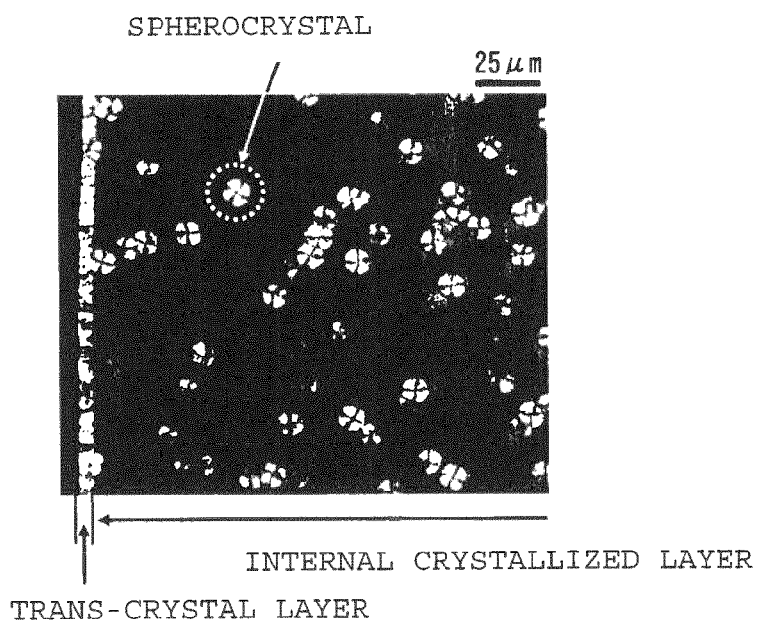
FIG. 2 is a drawing to show a surface-crystallized layer and an internal crystallized layer of a crystallized polyester prepolymer particle of the present invention.

On the other hand, the particles of the present invention are characterized in that a crystalline layer containing fine spherocrystals with a diameter of less than 5 µm and crystalline nuclei is formed between the transcrystal layer and the internal crystalline layer (cf. FIG. 2).

In the present invention, this crystalline layer is called a "surface-crystallized layer containing spherocrystals with a diameter of less than 5 µm" or simply a "surface-crystallized layer" and a "thickness of the surface-crystallized layer" means a thickness of the "surface-crystallized layer" plus a thickness of the transcrystal layer.

The particles of the present invention have the surface-crystallized layer with spherocrystals having the diameter of less than 5 µm and the thickness of the surface-crystallized layer is at least 15 µm, preferably at least 20 µm and further preferably at least 25 µm, and at most 110 µm, preferably at most 105 µm. Here, the thickness of the surface-crystallized layer less than 15 µm is not preferable because the suppression of stickiness due to the amorphous portion in the surface-crystallized layer becomes insufficient and the fusion suppression effect among particles is not developed. Furthermore, the thickness over 110 µm is not preferable because a rate of discharging a by-product produced in the solid-phase polycondensation from the particles decreases and, therefore, the solid-phase polycondensation reaction rate decreases.

The thickness of the surface-crystallized layer can be set in a desired range by controlling the value of $(T-Tg)t$ in accordance with appropriate selection of the temperature, time, and so on in the hot-water treatment.

The thickness of the surface-crystallized layer of the particles of the present invention is measured by observing a cross section of the particle with an optical microscope, in accordance with the method described below.

One particle after the crystallization is entirely coated in close contact with an epoxy resin (Bondquick 5 manufactured by Konishi Co., Ltd.) and the particle is left in an oven at 40° C. for 2 hours to set the epoxy resin, thereby preparing a measurement sample. The sample is so fixed that a surface portion of the particle is perpendicular to a blade of a microtome for an optical microscope manufactured by Leitz Company, and it is cut near the center of chip to obtain a piece in a thickness of about 5 µm. The piece obtained is picked up and place on a slide glass with tweezers, immersed in an oil and pressurized to smooth with a cover glass thereon, thereby obtaining a sample for observing the particle cross section. The observation sample of particle cross section is observed and set in focus under crossed nicols with a polarizing microscope and a crystalline form near the surface is photographed at the 400-fold magnification with a Polaroid film. In the photograph taken, a portion containing spherocrystals with a diameter of at least 5 µm is regarded as the internal crystalline layer, a perpendicular distance is measured between the outermost surface of the internal crystalline layer and the surface of the particle and the resulting value is corrected with a 10 µm scale for optical microscope, thereby obtaining the thickness of the surface-crystallized layer.

It is noted that because the lower limit of the length quantitatively measurable by this method is 5 µm, diameters of the spherocrystals contained in the surface-crystallized layer cannot be quantitatively measured.

The thickness of the surface-crystallized layer of the particles according to the present invention is preferably at most 40% of the minor axis of the particle, more preferably at most 35% thereof. The thickness of the surface-crystallized layer to the minor axis of the particle is further preferably within this range because there is no decrease in the solid-phase polycondensation rate. Here, the "minor axis of the particle" is defined as described below in accordance with the shape of the particle.

Namely, when the particle is spherical, it is the diameter; when the particle is semispherical, it is the radius; and when the particle is ellipsoidal, it is the shortest diameter. Furthermore, when the particle has a shape of an elliptical cylinder (including a cylinder), a rectangular parallelepiped (including a regular hexahedron) or an intermediate shape between them, the minor axis is the shorter between the minor axis or the shorter side of the bottom surface, and the height. Here, the "elliptical cylinder" means a column with a bottom having an oval form, and the "rectangular parallelepiped" means a column with a bottom having a rectangular form. Furthermore, the "intermediate shape between them" means a column with a bottom having a shape which is inscribed in a rectangle having longer sides and shorter sides equal to the major axis and minor axis of the bottom, respectively.

The particles of the present invention are more efficiently produced by the production method of the polyester resin according to the present invention.

Specifically, the crystallized polyester prepolymer particles of the present invention are more efficiently obtained, for example, by conducting the hot-water treatment which comprises bringing the polyester prepolymer particles with the intrinsic viscosity of from at least 0.10 dL/g to at most 1.0 dL/g and with the density of at most 1.36 g/cm$^3$ into contact with hot water at a temperature higher than the glass transition temperature of the polyester prepolymer particles and less than 100° C., under the condition satisfying the above-mentioned formula (1), then removing the attached water by dehydration, and crystallizing the particles under stirring or under fluidization at a temperature of from at least 120° C. to at most 200° C. for a retention time of from 1 to 60 minutes.

Moreover, the polyester resin particles of the present invention can be more efficiently obtained when the crystallized polyester prepolymer particles are subjected to solid-phase polycondensation at a temperature of from at least 190° C. to at most 245° C. in an inert gas atmosphere for a retention time of from 1 to 30 hours so that the intrinsic viscosity is set in the range of from at least 0.60 dL/g to at most 1.5 dL/g.

The polyester resin particles with a desired intrinsic viscosity are obtained by appropriately controlling the temperature, pressure, retention time, and so on in the crystallization step and the solid-phase polycondensation step.

Examples of other production methods for the particles of the present invention include a method wherein the hot-water treatment condition in the above-mentioned production method is changed, for example, the polyester prepolymer particles are immersed in water at a temperature of not more than Tg of the polyester prepolymer particles for a long period of time, a method wherein the particles are immersed in an organic solvent such as ethanol or acetone, a method wherein the particles are brought into contact with steam at a temperature of at least 100° C., and so on. However, these methods might have one of the following problems: a long period of time is required for the treatment; an apparatus for removing the organic solvent is required; particles are likely to undergo fusion during the treatment. Accordingly, the production method of the polyester resin according to the present invention can be said as the best method for obtaining the particles of the present invention.

Next, embodiments of the method for producing PET of the present invention will be explained below in detail.

The heat treatment of the present invention mainly comprises the crystallization step and the first solid-phase polycondensation step, and may further comprise a step of treating the PET prepolymer in a solid state normally under a temperature condition over an ordinary temperature, such as a drying step.

Incidentally, the intrinsic viscosity is used as an index for a molecular weight of PET in the present invention.

PET Prepolymer

There are no particular restrictions on a production method of the PET prepolymer used in the present invention, and it can be produced by one of conventional production methods of PET, for example. Specifically, it is usually produced by subjecting a dicarboxylic acid component composed mainly of terephthalic acid and/or an ester-forming derivative thereof and a diol component composed mainly of ethylene glycol to an esterification reaction and/or a transesterification reaction, if necessary, in the presence of an esterification or transesterification catalyst, and then subjecting the resultant to melt polycondensation in the presence of a polycondensation catalyst. More specifically, for example, a method is as follows: the dicarboxylic acid component and the diol component as raw materials are charged into a slurry preparation vessel and they are stirred and mixed to obtain a raw material slurry; the slurry is subjected to an esterification reaction in an esterification reaction vessel under from an ordinary pressure to an increased pressure and under heat while water or the like produced by the reaction is distilled away; and the resulting PET low-molecular weight product (oligomers) as an esterification product is transferred into a polycondensation vessel and subjected to melt polycondensation under a reduced pressure, under heat, and in the presence of a polycondensation catalyst to obtain the PET prepolymer.

In the present invention the term "composed mainly of terephthalic acid and/or its ester-forming derivative" means that a rate of terephthalic acid and/or its ester-forming derivative is at least 90 mol %, preferably at least 95 mol % to all the dicarboxylic acid components used for the production of PET and the term "composed mainly of ethylene glycol" means that a rate of ethylene glycol is at least 90 mol %, preferably at least 95 mol % to all the diol components used for the production of the PET.

Examples of the dicarboxylic acid component other than terephthalic acid include aromatic dicarboxylic acids such as phthalic acid, isophthalic acid, dibromoisophthalic acid, sodium sulfoisophthalate, phenylenedioxydicarboxylic acid, 4,4'-diphenyldicarboxylic acid, 4,4'-diphenyl etherdicarboxylic acid, 4,4'-diphenyl ketonedicarboxylic acid, 4,4'-diphenoxyethanedicarboxylic acid, 4,4'-diphenyl sulfonedicarboxylic acid and 2,6-naphthalenedicarboxylic acid, alicyclic dicarboxylic acids such as hexahydroterephthalic acid and hexahydroisophthalic acid, aliphatic dicarboxylic acids such as succinic acid, glutaric acid, adipic acid, pimelic acid, suberic acid, azelaic acid, sebacic acid, undecadicarboxylic acid and dodecadicarboxylic acid and so on, and ester-forming derivatives thereof.

Examples of the diol component other than ethylene glycol include aliphatic diols such as diethylene glycol, trimethylene glycol, tetramethylene glycol, pentamethylene glycol, hexamethylene glycol, octamethylene glycol, decamethylene glycol, neopentyl glycol, 2-ethyl-2-butyl-1,3-propanediol, polyethylene glycol and polytetramethylene ether glycol; alicyclic diols such as 1,2-cyclohexanediol, 1,4-cyclohexanediol, 1,1-cyclohexanedimethylol, 1,4-cyclohexanedimethylol and 2,5-norbornanedimethylol; aromatic diols such as xylylene glycol, 4,4'-dihydroxybiphenyl, 2,2-bis(4'-hydroxyphenyl)propane, 2,2-bis(4'-β-hydroxyethoxyphenyl)propane, bis(4-hydroxyphenyl)sulfone and bis(4-β-hydroxyethoxyphenyl)sulfone; ethylene oxide adducts and propylene oxide adducts of 2,2-bis(4'-hydroxyphenyl) propane; and so on.

There are no particular restrictions on the esterification or transesterification catalyst, and on the polycondensation reaction catalyst to be used in the present invention, and for example, the catalysts can be optionally selected from known catalysts and used as added. Examples of the catalyst include germanium compounds such as germanium dioxide, germanium tetroxide, germanium hydroxide, germanium oxalate, germanium tetraethoxide and germanium tetra-n-butoxide; antimony compounds such as antimony trioxide, antimony pentoxide, antimony acetate and methoxy antimony; titanium compounds such as tetra-n-propyl titanate, tetra-i-propyl titanate, tetra-n-butyl titanate, titanium oxalate and titanium potassium oxalate; and tungsten compounds such as tungsten trioxide, paratungstic acid, metatungstic acid, tungstic acid, silicotungstic acid, phosphotungstic acid and salts thereof; and so on. They can be used singly or in combination of two or more compounds. Among others, the titanium compound and/or tungsten compound is preferably used because of high polycondensation reactivity.

An amount of the catalyst used is usually preferably from 1 to 400 mass ppm, more preferably from 2 to 300 mass ppm, to the PET prepolymer obtained, based on the metal atom of the catalyst used. Since the titanium compound also acts as the esterification and/or transesterification catalyst, it is preferable that, when used in these reactions, the used amount thereof be considered to fall within this range.

A phosphorus compound such as orthophosphoric acid, orthophosphoric acid alkyl esters, ethyl acid phosphate, triethylene glycol acid phosphate, phosphorous acid or phosphorous acid alkyl esters, may be used as a stabilizer in the above-mentioned reactions. An amount of the phosphorus compound to be used is preferably about from 1 to 1000 mass ppm, particularly preferably from 2 to 200 mass ppm, to the PET prepolymer obtained, based on the phosphorus atom.

Furthermore, compounds of alkali metals and alkaline earth metals, such as lithium acetate, sodium acetate, potassium acetate, magnesium acetate, magnesium hydroxide, magnesium alkoxide, magnesium carbonate, potassium hydroxide, calcium hydroxide, calcium acetate and calcium carbonate, can be used together with the above-mentioned catalyst.

A representative example among more specific production methods of the PET prepolymer used in the present invention is as follows.

The dicarboxylic acid composed mainly of terephthalic acid, and/or its ester-forming derivative, and a diol component composed mainly of ethylene glycol are used normally in a ratio of dicarboxylic acid component:glycol component of 1:1-1:2 (molar ratio) and subjected to an esterification reaction, if necessary in the presence of an esterification catalyst, or a transesterification reaction in the presence of a transesterification catalyst, normally, at a temperature of about from 240 to 280° C. and, normally, under a pressure of from the ordinary pressure to a pressure of about 0.4 MPa relative to the atmospheric pressure for about from 1 to 10 hours in an esterification reaction vessel; and the resulting product (PET low-molecular weight product) is transferred into a polycondensation reaction vessel and then subjected to melt polycondensation. The melt polycondensation is conducted in the presence of a polycondensation catalyst under stirring, normally, at a temperature of about from 250 to 290° C. and under a pressure condition of starting from the ordinary pressure, reducing the pressure gradually, and finally keeping the pressure, normally, at an absolute pressure of about from 10 to 0.1 kPa until the intrinsic viscosity becomes from 0.18 dL/g to 0.40 dL/g as described below.

Incidentally, if the dicarboxylic acid component is one with a moderate melting point such as an ester-forming derivative of the dicarboxylic acid, e.g., dimethyl terephthalate, it can be supplied to the transesterification reaction with the diol after it is melted, instead of forming the slurry with the diol. Furthermore, the above-mentioned reaction can be conducted in at least one manner selected from continuous, batch-wise and semibatch-wise manners, and each of the esterification reaction vessel (or the transesterification reaction vessel) and the melt polycondensation reaction vessel may be a single-step or multistep vessel.

The PET prepolymer obtained by the melt polycondensation reaction is supplied to a die head connected through a pipe and/or a gear pump and/or a filter to the melt polycondensation reaction vessel and discharged in the form of strands or droplets from a plurality of die holes formed at the tip of the die. The PET prepolymer discharged in the form of strands is cut, for example, with a strand cutter to become particulate in the form of particles.

The PET prepolymer particles obtained by the melt polycondensation reaction used in the present invention preferably have an average mass of from at least 0.1 mg/particle to at most 30 mg/particle; the lower limit thereof is more preferably 0.5 mg/particle, particularly preferably 0.8 mg/particle, and the upper limit is more preferably 10 mg/particle, further preferably 5 mg/particle and particularly preferably 3 mg/particle. When the average mass of the PET prepolymer particles used in the present invention is not lower than the lower limit, troubles such as adhesion and blocking are unlikely to occur in the subsequent steps and in pneumatic transportation. On the other hand, when the average mass is not higher than the upper limit, a solid-phase polycondensation reaction time required for reaching the desired molecular weight can be shortened. Therefore, the average mass is further preferably in the foregoing range. Here, the average mass of the PET prepolymer means a value obtained by measuring the total mass of 30 particles of the PET prepolymer to the decimal position of 0.1 mg with a precision balance and by dividing the measured value by 30.

The intrinsic viscosity of the PET prepolymer used in the present invention is preferably from at least 0.18 dL/g to at most 0.40 dL/g. The lower limit of the intrinsic viscosity is more preferably 0.20 dL/g and the upper limit is more preferably 0.38 dL/g, particularly preferably 0.35 dL/g. If the intrinsic viscosity of the prepolymer is less than the lower limit, fine particles are likely to be produced in the particulation and the solid-phase polycondensation reaction time tends to become longer for achievement of a desired high molecular weight. On the other hand, if the intrinsic viscosity exceeds the upper limit, the effect of shortening the reaction time required for obtaining the high-molecular weight PET, which is the characteristic of the present invention, is unlikely to be achieved. In addition, expensive facilities such as equipment for stirring a highly viscous liquid and equipment for a high vacuum reaction might be required in the melt polycondensation step, whereby the effect of the present invention tends to be reduced as an overall production process.

The terminal carboxyl group concentration of the PET prepolymer used in the present invention is preferably at most 100 eq/ton. The terminal carboxyl group concentration is more preferably at most 70 eq/ton, further preferably at most 40 eq/ton and particularly preferably at most 30 eq/ton.

If the terminal carboxyl group concentration of the PET prepolymer exceeds 100 eq/ton, the polycondensation reaction rate tends to become small in the subsequent step of the solid-phase polycondensation step.

Heat Treatment

The PET prepolymer particles obtained as described above are subjected to a heat treatment in a solid state to undergo solid-phase polycondensation to a predetermined intrinsic viscosity according to the method of the present invention. In the present invention, the heat treatment includes a drying step, a temperature-raising step, a crystallization step, a solid-phase polycondensation step, and so on, and refers to a step of treating the PET prepolymer particles in a solid state under a temperature condition over an ordinary temperature. Furthermore, the lower limit of the temperature in the heat treatment is normally 120° C., preferably 125° C., and the upper limit is normally 245° C., preferably 240° C. This heat-treatment temperature may be optionally selected as a preferable temperature depending on the object of the heat treatment or the temperature may be changed stepwise. In particular, the heat treatment of the present invention mainly contains the crystallization step and the first solid-phase polycondensation step. These steps can be conducted in a batch-wise manner but they are preferably conducted in a continuous manner in terms of production efficiency.

The intrinsic viscosity of the PET obtained in the present invention is usually at least 0.70 dL/g. For production of a PET with an intrinsic viscosity of less than 0.70 dL/g, the PET with the aimed intrinsic viscosity can be obtained only by the conventional melt polycondensation and it is unnecessary to apply the present invention.

In the present invention, where the polyester prepolymer is a polyethylene terephthalate prepolymer and where the heat treatment is carried out in a solid state, the heat treatment comprises at least the crystallization step and the first solid-phase polycondensation step in this order, and satisfies the following conditions (A) and (B):

(A) the crystallization step comprises a treatment of the polyethylene terephthalate prepolymer, wherein a temperature Tx of the treatment is from at least 110° C. to at most 210° C. and a time θx of the treatment is from at least 3 minutes to at most 30 minutes; and (B) the first solid-phase polycondensation step comprises subjecting the polyethylene terephthalate prepolymer after the crystallization step to a process of raising temperature from a temperature not more than the temperature Tx of the treatment in the crystallization step to a reaction temperature T1 in the first solid-phase polycondensation step, in an inert gas atmosphere or under a reduced pressure, wherein the temperature is raised from Tx(° C.) to T1(° C.) within 30 minutes, and wherein a reaction time θ1 at the temperature T1 satisfies the following formulae (2) to (4):

$$Tx+20 \leq T1 \qquad (2),$$

$$180° C. \leq T1 \leq 230° C. \qquad (3), \text{ and}$$

$$\theta x < \theta 1 \qquad (4).$$

The crystallization step is conducted in a gas atmosphere or under a reduced pressure, preferably in an inert gas atmosphere or under a reduced pressure. The term "inert gas" here means a gas that has an oxygen concentration of at most 0.1% by volume, preferably at most 0.05% by volume and that substantially does not react with polyethylene terephthalate (PET). Specific examples of the gas that does not substantially react with polyethylene terephthalate include nitrogen, helium, neon, argon, xenon, carbon dioxide and so on, and nitrogen is preferably used mainly in terms of economic efficiency. Furthermore, the term "under a reduced pressure" means a state in which the pressure is an absolute pressure of at most 2 kPa.

The first solid-phase polycondensation step is conducted in an inert gas atmosphere or under a reduced pressure as the foregoing crystallization step is.

The temperature Tx in the crystallization step is from at least 110° C. to at most 210° C., and the lower limit is preferably 120° C., more preferably 125° C. The upper limit of Tx is preferably 205° C. Tx of less than 120° C. is not preferable because the resistance to the fusion decreases in the subsequent first solid-phase polycondensation step. Tx exceeding 210° C. is not advantageous mainly because the fusion is likely to occur among PET particles in the crystallization step.

The time θx of the crystallization step is from at least 3 minutes to at most 30 minutes, and the lower limit is preferably 4 minutes. The upper limit of θx is preferably 25 minutes. θx of less than 3 minutes is not preferable because the resistance to the fusion decreases in the first solid-phase polycondensation step. θx exceeding 30 minutes is not advantageous mainly because the resistance to the fusion decreases after the first solid-phase polycondensation step.

Furthermore, the reaction temperature in the first solid-phase polycondensation step after the crystallization step of the present invention is required to satisfy Tx+20° C.≤T1 (formula (2)) to the temperature Tx in the crystallization step, and the temperature needs to be raised by at least 20° C. from Tx to T1 within 30 minutes in the temperature raising process in the first solid-phase polycondensation step.

As described above, the temperature Tx in the crystallization step is from at least 110° C. to at most 210° C., but a satisfactory solid-phase polycondensation reaction rate cannot be obtained normally unless the reaction temperature T1 in the first solid-phase polycondensation step satisfies at least 180° C. As a result, T1 satisfies the following formula (3).

$$180° C. \leq T1 \leq 230° C. \qquad (3)$$

This setting achieves the effect of the present invention being the improvement in the resistance to the fusion after the temperature raising process.

Although it is not clear why the effect of the present invention is obtained by the heat treatment step as described above, it is presumed as follows.

Namely, there is some difference between a crystal structure after the heat treatment at a low temperature and a crystal structure after the heat treatment at a high temperature, in the crystallization step, and it is presumed that the crystalline structure obtained through the high-temperature heat treatment has superior heat resistance. When the heat treatment is carried out at a low temperature for a long period of time, when the temperature rise range is less than 20° C., or when the time required to raise the temperature is more than 30 minutes, the crystalline structure formed at the low temperature and being inferior in the heat resistance can affect the subsequent steps to degrade the resistance to the fusion. On the other hand, according to the present invention, the heat treatment is conducted in a relatively short period of time in the crystallization step and then the temperature is raised in the temperature rise range of at least 20° C. within 30 minutes; it is thus presumed that a crystalline structure superior in the heat resistance to the crystal formed in the crystallization step is formed in the first solid-phase polycondensation step at the temperature higher than that in the crystallization step, thereby improving the resistance to the fusion.

In the first solid-phase polycondensation step, the reaction time θ1 at the reaction temperature T1 is set longer than the treating time θx in the crystallization step, and as a result, the following formula (4) is satisfied.

$$\theta x < \theta 1 \qquad (4)$$

The reaction time θ1 shorter than θx is not preferable because a crystalline structure excellent in the heat resistance cannot be adequately formed at temperature T1 and the resistance to the fusion is not improved.

Both of the treating time θx in the crystallization step and the reaction time θ1 at the reaction temperature T1 show an average residence time obtained by the following formula (7).

$$H/L \qquad (7)$$

(L: treating amount in each step (kg/hr), H: a holding amount (kg) in each step)

Here, "H: a holding amount in each step" is a value obtained from a flow rate of the PET prepolymer (treating amount) and an internal volume of apparatus, depending on properties of each apparatus.

A fluidized bed is preferably used in the crystallization step, and in particular, a fluidized bed in which θx satisfies the following formula (8) is more preferable.

$$D/\theta x \leq 0.2 \qquad (8)$$

(D: width of a residence time distribution at a point where the frequency becomes half of a mode value of the residence time distribution)

A moving bed is preferably used in the first solid-phase polycondensation step, and in particular, the moving bed in which θ1 satisfies the following formula (9) is more preferable.

$$D/θ1 \leq 0.1 \tag{9}$$

(D: width of the residence time distribution at the point where the frequency becomes half of the mode value of the residence time distribution)

The reaction time θ1 is usually from at least 12 minutes to at most 360 minutes though it depends on the reaction temperature T1, and the lower limit thereof is preferably 18 minutes. The upper limit is preferably 300 minutes, and more preferably 240 minutes.

When the reaction time θ1 in the first solid-phase polycondensation step is at least 12 minutes, the resistance to the fusion is improved in the first solid-phase polycondensation step and the fusion is reduced in the temperature raising step and in the second solid-phase polycondensation step after the first solid-phase polycondensation step. Furthermore, when the reaction time θ1 in the first solid-phase polycondensation step is at most 240 minutes, the solid-phase polycondensation reaction rate shows just slight decrease in the latter half of the second solid-phase polycondensation step. Thus, each condition is efficient and further preferable.

The above-mentioned crystallization step and first solid-phase polycondensation step of the present invention are preferably conducted in a continuous manner, and the continuous fluidized bed and moving bed are particularly preferably used in terms of production efficiency, reaction control, operability, and so on. In particular, the crystallization step is preferably conducted with use of the fluidized bed because the PET prepolymer in an amorphous state is usually used and the fusion is thus likely to occur inside the apparatus.

In the present invention, it is preferable to conduct a step of subjecting the PET prepolymer in a substantially amorphous state to a surface treatment, prior to the crystallization step in the heat treatment. The surface treatment of the PET prepolymer can reduce the fusion among the PET prepolymer particles in the subsequent crystallization step.

Examples of methods of the surface treatment include various techniques including known techniques, e.g., a technique of forming roughness on the surface or leaving an orientation history by applying a mechanical impact to the surface of the PET prepolymer particles or by conducting a shear treatment; a technique of immersing the particles in a liquid at or above an ordinary temperature, e.g., a liquid such as water, an aromatic hydrocarbon, an ester, a ketone and an alcohol, more specifically, a liquid such as benzene, ethyl acetate, acetone, methyl ethyl ketone, methanol, ethanol, ethylene glycol, diethylene glycol, triethylene glycol or a mixture thereof; or a technique of conducting a heat treatment by bringing the PET prepolymer particles into contact with vapor of one of the above-mentioned liquids.

A technique of the surface treatment to be applied to the present invention is more preferably a technique of immersing the PET prepolymer particles in heated water (hot-water treatment) from the viewpoints of production efficiency, safety, and the like.

This hot-water treatment step is preferably a step of bringing the PET prepolymer into contact with hot water at a temperature higher than the glass transition temperature of the PET prepolymer and less than 100° C., under the condition satisfying the following formula (1):

$$40 \leq (T-Tg)t \leq 6000 \tag{1}$$

wherein t is a hot-water treatment time (second), T is the temperature of the hot water (° C.) and Tg is the glass transition temperature (° C.) of the PET prepolymer.

Namely, the temperature T(° C.) of the hot-water used in the hot-water treatment is preferably less than 100° C. and more preferably at most 95° C. The lower limit of the hot-water treatment temperature T(° C.) is preferably higher than the glass transition temperature Tg(° C.) of the PET prepolymer particles, and among others, it is more preferably at least 1° C. higher than Tg, particularly preferably at least 5° C. higher than Tg; the lower limit of the temperature of the hot water is 60° C. and particularly preferably 65° C. The temperature of the hot water within this range is further preferable because the effect of the present invention is obtained by the treatment for a relatively short period of time and it does not cause any problem of reduction in the solid-phase polycondensation rate.

Furthermore, the method of the present invention preferably comprises a temperature rise step after the first solid-phase polycondensation step of the heat treatment, wherein the PET prepolymer after the crystallization step and the first solid-phase polycondensation step is subjected to a step of raising temperature from a temperature not more than the reaction temperature T1 of the treatment in the first solid-phase polycondensation step to a maximum achieving temperature T2, in an inert gas atmosphere or under a reduced pressure, and the temperature is raised from T1(° C.) to (T1+15)(° C.) within 30 minutes, and the temperature T1(° C.) and the temperature T2(° C.) satisfy the following formulae (5) and (6):

$$T1+15 \leq T2 \tag{5}$$

$$205° C. \leq T2 \leq 240° C. \tag{6}$$

When the particles are crystallized in a low molecular weight in such a temperature rise step, mobility of polyester molecular chains decreases by virtue of formation of the crystalline structure and some of terminal groups are inactivated; in particular, when the particles are crystallized in a low molecular weight, the absolute value of the number of terminal groups to be inactivated becomes so large that the polycondensation reaction rate becomes small in the latter half of the solid-phase polycondensation. On the contrary, it is presumed that when the heat treatment is implemented on the way with a temperature difference of at least 15° C. for a short period of time, melting crystals melt and recrystallize though being still in the solid state, to again form an amorphous region in which many terminal groups exist, and some of terminal groups inactivated recover their activity to increase the polycondensation reaction rate. If the temperature rise width is less than 15° C. or if the time for the temperature rise step exceeds 30 minutes, the process might fail to achieve the improving effect of the solid-phase polycondensation reaction rate of the present invention, particularly, the effect in the second solid-phase polycondensation step.

This temperature rise step is preferably conducted with use of the fluidized bed from the viewpoints of production efficiency, reaction control, operability, and so on.

The method of the present invention further comprises a second solid-phase polycondensation step after the temperature rise step subsequent to the first solid-phase polycondensation step, wherein the second solid-phase polycondensation step is a step of subjecting the polyethylene prepolymer after the crystallization step, the first solid-phase polycondensation step and the temperature rise step, to a reaction in an inert gas atmosphere or under a reduced pressure, preferably, for a reaction time θ2 of from at least 120 minutes to at most 3000 minutes, and a temperature T3 of the reaction is preferably from at least 190° C. to at most 240° C.

The temperature T3 of the second solid-phase polycondensation step is from at least 190° C. to at most 240° C., and the lower limit of T3 is preferably 210° C., more preferably 220° C. The upper limit of T3 is preferably 237° C. and more preferably 235° C. If T3 is less than 190° C., a long period of time is required to reach the aimed polymerization degree. On the other hand, T3 exceeding 240° C. is inconvenient because the fusion is likely to occur among PET particles. Even if T3 is lower than the temperature T2 in the temperature rise step, the effect of the present invention, i.e., a high solid-phase polycondensation rate is obtained.

In the present invention, the temperature rise and solid-phase polycondensation may be further alternately repeated at least three times in the same manner as described above.

As described above, the method of alternately repeating the temperature rise step of raising the temperature to a relatively high temperature in a short period of time and the solid-phase polycondensation step at a relatively low temperature tends to succeed in suppressing the fusion when the solid-phase polycondensation step is carried out with use of the moving bed, particularly, in the solid-phase polycondensation of the PET prepolymer likely to undergo the fusion due to a high copolymerization amount. Furthermore, the method is further preferable because it tends to succeed in suppressing the inactivation of some of terminal groups caused by execution of the solid-phase polycondensation for a long period of time and thus tends to shorten the overall time of the heat treatment.

EXAMPLES

Now, the present invention will be explained in further detail with reference to the examples. However, it should be understood that the present invention is by no means restricted thereto.

Furthermore, measurement methods and evaluation methods for various properties in the present invention are as follows.

(1) Intrinsic Viscosity (IV)

About 0.25 g of a sample was put in about 25 ml of a mixed solvent of phenol/1,1,2,2-tetrachloroethane (mass ratio: 1/1), and dissolved to a concentration of $1.00 \times 10^{-2}$ kg/l at 110° C. in 30 minutes for the amorphous polyester prepolymer or at 140° C. in 30 minutes for the polyester prepolymer or polyester after the heat treatment, and the resulting solution was cooled to 30° C. Thereafter, the number of seconds for dropping of each of the sample solution in the concentration of $1.00 \times 10^{-2}$ kg/l and the solvent alone was measured with an automatic solution viscometer ("2CH model DJ504" manufactured by SENTEC Corporation Limited) and the intrinsic viscosity was calculated according to the following formula.

$$IV=[(1+4K_H\eta_{sp})^{0.5}-1]/(200K_HC)$$

In this equation, $\eta_{sp}=\eta/\eta_0-1$, is the number of seconds for dropping of the sample solution, $\eta_0$ is the number of seconds for dropping of the solvent, C is the concentration of the polymer solution (kg/l) and $K_H$ is the Huggins constant. $K_H$ adopted herein was 0.33.

(2) Density

The density was determined by precisely weighing from 6 to 8 g of a sample in a measurement cell and measuring the density thereof at a measurement temperature of 23° C. with a dry-type automatic densimeter ("Accupyc1330" manufactured by SHIMADZU CORPORATION).

(3) Glass Transition Temperature (Tg)

The glass transition temperature was measured with a differential scanning calorimeter "DSC7" manufactured by Perkin Elmer, Inc. 10 mg of a dried prepolymer was cut with minimum shear strength using a stainless-steel blade manufactured by FEATHER Safety Razor Co., Ltd. and was placed in an aluminum standard pan for a solid, thereby obtaining a sample. The temperature was raised from room temperature to 300° C. at a temperature rise rate of 20° C./min in a nitrogen atmosphere while using a vacant pan as a blank. Tg is determined from a behavior of change in the specific heat caused by glass transition in a calorimetric curve. Specifically, Tg was defined as a temperature at an intersection between a tangent line to the curve at a middle point of a change of the specific heat caused by the glass transition and a tangent line to the curve at a point prior to the change of the specific heat.

(4) Average Particle Size

The average particle size was determined by making a cumulative distribution curve in accordance with the dry sieving test as described in JISK0069, and defining a value at the cumulative percentage of 50% as the average particle size.

(5) Measurement of Thickness of Surface-Crystallized Layer

One particle after the crystallization was entirely coated in close contact with an epoxy resin (Bondquick 5 manufactured by Konishi Co., Ltd.) and the particle was left in an oven at 40° C. for 2 hours to set the epoxy resin, thereby preparing a measurement sample.

The sample was so fixed that a surface portion of the particle was perpendicular to a blade of a microtome for an optical microscope manufactured by Leitz Company, and it was cut near the center of chip to obtain a piece in a thickness of about 5 μm. The piece obtained was picked up and place on a slide glass with tweezers, immersed in an oil and pressurized to smooth with a cover glass thereon, thereby obtaining a sample for observing the particle cross section.

The observation sample of particle cross section was observed and set in focus under crossed nicols with a polarizing microscope and a crystalline form near the surface was photographed at the 400-fold magnification with a Polaroid film.

In the photograph taken, a portion containing spherocrystals with a diameter of at least 5 μm was regarded as the internal crystalline layer, a perpendicular distance was measured between the outermost surface of the internal crystalline layer and the surface of the particle and the resulting value was corrected with a 10 μm scale for optical microscope, thereby obtaining the thickness of the surface-crystallized layer.

It is noted that because the lower limit of the length quantitatively measurable by this method is 5 μm, diameters of the spherocrystals contained in the surface-crystallized layer cannot be quantitatively measured.

(6) Evaluation of Fusion after Hot-Water Treatment 15 g of prepolymer particles were subjected to the hot-water treatment and all the particles after the hot-water treatment were put over a semispherical strainer with a diameter of 160 mm and a depth of 45 mm, and cooled with air. If there was a bulk composed of at least 10 particles resulting from the fusion of prepolymer particles, evaluation was occurrence of the fusion (X); if no fusion was observed or if there was only a bulk or bulks composed of less than 10 particles, evaluation was no fusion (○).

(7) Heat Fusion Test 7 g of prepolymer particles after the hot-water treatment were spread in a vat and the vat was heated at 143° C. in an inert oven for 3 minutes to crystallize the particles. Thereafter, they were taken out and cooled with air. The particles were stuffed in a 50 ml beaker and a weight was so loaded on the opening of the beaker that a pressure of 50 g/cm$^2$ was exerted. Then it was heated to 175° C., heated thereat in an inert oven for 30 minutes under flow of nitrogen at a flow rate of 20 Nl/min, and then was taken out. The temperature was returned to room temperature and the particles were taken out of the beaker. If there was a bulk composed of at least 10 particles resulting from fusion of prepolymer particles, evaluation was occurrence of fusion (X): if no fusion was observed or if there was only a bulk or bulks composed of less than 10 particles, evaluation was no fusion (○).

(8) Haze

Particles after the solid-phase polycondensation were stuffed in a square spacer with a side of 30 mm and a thickness of 2 mm, and both sides were sandwiched between kapton films having a thickness of 50 μm. The spacer was left in a pressing machine heated at 290° C., for five minutes for preheating and left under an elevated pressure of 10.1 MPa for five minutes. Then the spacer was immediately moved to a water-cooled pressing machine at 25° C. and cooled under an elevated pressure of 10.1 MPa for three minutes.

Thereafter, a pressed sheet was taken out and the haze thereof was measured by means of a haze meter ("NDH-300A" manufactured by NIPPON DENSHOKU INDUSTRIES CO., LTD.).

(9) Average Mass of PET Prepolymer Particles

The average mass per one particle was obtained by measuring the total mass of 30 particles of the PET prepolymer to the decimal position of 0.1 mg with a precision balance and by dividing the measured value by 30.

(10) Terminal Carboxyl Group Concentration (AV)

A sample was pulverized, dried at 140° C. for 15 minutes with a hot-air drier, and cooled to room temperature in a desiccator. 0.1 g of the resulting sample was precisely weighed and put in a test tube. 3 ml of benzyl alcohol was added thereto and the sample was dissolved at 195° C. in 3 minutes under blow of a dry nitrogen gas. Then, 5 ml of chloroform was gradually added thereto and the resulting solution was cooled to room temperature. One or two droplets of a phenol red indicator were added to the solution and the solution was titrated with a 0.1 N benzyl alcohol solution of sodium hydroxide under stirring and under blow of a dry nitrogen gas. The titration was finished at a point at which the solution changed from yellow to red. Furthermore, the same operation was carried out as a blank, without using the polyester resin sample. A terminal carboxyl group concentration was calculated with these results in accordance with the following formula.

$$AV(eq/ton)=(A-B)\times 0.1\times f/W$$

where A is an amount (μl) of the 0.1 N benzyl alcohol solution of sodium hydroxide required for the titration of the sample, B is an amount (μl) of the 0.1 N benzyl alcohol solution of sodium hydroxide required for the titration of the blank, W is an amount (g) of the polyester resin sample and f is a titer of the 0.1 N benzyl alcohol solution of sodium hydroxide.

The titer (f) of the 0.1 N benzyl alcohol solution of sodium hydroxide was obtained as follows. 5 ml of methanol was put in a test tube; one or two droplets of an ethanol solution of phenol red were added as an indicator; titration was conducted to a point of color change with 0.4 ml of the 0.1 N benzyl alcohol solution of sodium hydroxide; then 0.2 ml of 0.1 N hydrochloric acid with a known titer was added as a standard solution; titration was conducted again to a point of color change with 0.1 N benzyl alcohol solution of sodium hydroxide (the above operation was conducted under blow of a dry nitrogen gas); and the titer was calculated in accordance with the following formula.

$$\text{Titer }(f)=\text{titer of 0.1 N hydrochloric acid}\times\text{amount of}$$
$$\text{0.1 N hydrochloric acid (μl)/titration amount (μl)}$$
$$\text{of 0.1 N benzyl alcohol solution of sodium}$$
$$\text{hydroxide}$$

(11) Crystallinity (Xc)

Crystallinity (Xc) was calculated in accordance with the following formula from the density d (kg/m$^3$) of the sample, while adopting a perfect amorphous density da=1335 kg/m$^3$ and a perfect crystal density dc=1455 kg/m$^3$.

$$Xc=(d-da)dc/(dc-da)d\times 100\text{ (mass \%)}$$

Furthermore, the density d of the sample was determined by precisely weighing from 6 to 8 g of a sample in a measurement cell and measuring the density thereof at a measurement temperature of 23° C. with a dry-type automatic densimeter ("Accupyc1330" manufactured by SHIMADZU CORPORATION).

(12) Copolymerization mol % of Diethylene Glycol (DEG)

A reflux condenser was set by adding 50 ml of a 4 N potassium hydroxide/methanol solution in 5.00 g of PET prepolymer particles as a sample. The solution was refluxed under heating and stirring for 2 hours on a hot plate with a magnetic stirrer (surface temperature: 200° C.) to undergo hydrolysis. After the solution was allowed to cool, about 20 g of highly pure terephthalic acid was added and sufficiently shaken to neutralize to make a slurry with a pH of at most 9. The slurry was subjected to filtration with a glass filter (11G-4), and washed twice with 2 ml of methanol, and the filtrate and washed liquid were mixed to obtain a test liquid for gas chromatography. 1 μl of the test liquid was injected into a gas chromatography (model GC-14APF) manufactured by SHIMADZU CORPORATION with use of a microsyringe, and mol % of the diethylene glycol component to all the glycol components was calculated in accordance with the following formula from peak areas of ethylene glycol (EG) and diethylene glycol components.

$$\text{Copolymerization mol \% of DEG}=(A_{DEG}\times Cf_{DEG})/(\Sigma(A\times Cf))\times 100$$

ADEG: area of the diethylene glycol component (μV·second)

CfDEG: correction factor for the glycol component

A: area of each glycol component (μV·second)

Cf: correction factor for each glycol component

(13) Copolymerization mol % of Isophthalic Acid

1H-NMR of a solution in which PET prepolymer particles as a sample were dissolved in trifluoroacetic acid was measured by means of a nuclear magnetic resonance ("JNM-EX270 model" manufactured by JEOL Ltd.), and each peak was assigned. An integral value of each peak was obtained, from which mol % of the isophthalic acid component to all the carboxyl acid components was determined as a copolymerization amount.

Example 1

Terephthalic acid and ethylene glycol were continuously supplied to a slurry preparation vessel so that an amount of terephthalic acid became 13.0 parts by mass and an amount of ethylene glycol became 7.29 parts by mass, and 0.00135 part by mass of orthophosphoric acid was continuously added to the resulting preparation product to prepare a slurry. The slurry was continuously supplied to a first esterification vessel and continuously esterified at 260° C. and at about the ordinary pressure to prepare bis(2-hydroxyethyl) terephthalate in an esterification rate of 84% and low polycondensation products thereof. The reaction products were continuously supplied to a second esterification vessel, 0.00080 part by mass of germanium dioxide was continuously added to the reaction products, and the resultant was continuously reacted at 255° C. and at about the ordinary pressure to obtain bis(2-hydroxyethyl) terephthalate in an esterification rate of 95% and low polycondensation products thereof.

Furthermore, the reaction products were continuously supplied to a first polycondensation vessel, and continuously reacted at 270° C. under a reduced pressure of 2.6 kPa for an average residence time of about 1.2 hours. Next, the reaction products were continuously supplied to a second polycondensation vessel, and melt polycondensation was carried out at 278° C. under a reduced pressure of 0.5 kPa for an average residence time of about 1.2 hours. Subsequently, the reaction products were reacted at 280° C. and at 0.3 kPa in a third polycondensation vessel for an average residence time of about 1.2 hours to obtain a polyester prepolymer. The polyester prepolymer was pulled out in the form of strands from openings provided in the bottom of the polycondensation vessel, cooled with water and cut into a particulate form with a cutter, thereby obtaining polyester prepolymer particles.

The polyester prepolymer particles had the intrinsic viscosity of 0.64 dL/g, the density of 1.34 g/cm$^3$, the glass transition temperature (Tg) of 73° C. and the average particle size of 3.5 mm.

These prepolymer particles were thrown into hot water heated at 83° C. in a water bath, maintained for 30 seconds under stirring, immediately taken onto a strainer to remove water, and left in air for cooling, thereby conducting a hot-water treatment.

The prepolymer particles after the hot-water treatment are called "hot-water treated prepolymer particles".

No fusion was observed among the hot-water treated prepolymer particles after the cooling in air. The heat fusion test was conducted using the hot-water treated prepolymer particles and no fusion was observed.

The heat treatment was carried out as follows: the hot-water treated prepolymer particles were spread in a stainless-steel vat and heated at 160° C. in a nitrogen stream at 20 Nl/min in an inert oven (DN410I manufactured by Yamato), for 3 hours to crystallize; thereafter, the temperature was raised to 205° C. at a rate of 10° C./min and the solid-phase polycondensation was conducted at 205° C. for 20 hours; then cooled to room temperature, thereby obtaining polyester resin particles.

The polyester resin particles had the intrinsic viscosity of 0.83 dL/g, the minor diameter of particles of 2.8 mm, the thickness of the surface-crystallized layer of 50 μm and the haze of 2.3%.

Table 1 collectively shows these results.

Example 2

Polyester prepolymer particles were obtained in the same manner as in Example 1 except that the conditions in Example 1 were modified as follows: the phosphorus compound added in the slurry preparation vessel was changed to ethyl acid phosphate and its amount was changed to 0.000273 part by mass; the compound added in the second esterification vessel was changed to magnesium acetate tetrahydrate and its amount was changed to 0.000535 part by mass; and 0.00429 part by mass of tetra-n-butyl titanate was further added in the pipe on the way of from the first polycondensation vessel to the second esterification vessel.

The polyester prepolymer particles had the intrinsic viscosity of 0.62 dL/g, the density of 1.34 g/cm$^3$, the glass transition temperature Tg of 72° C., and the average particle size of 3.7 mm.

These prepolymer particles were thrown into hot water heated at 83° C. in a water bath, maintained for 30 seconds under stirring, immediately taken onto a strainer to remove water, and left in air for cooling to conduct a hot-water treatment. No fusion was observed among the hot-water treated prepolymer particles after the cooling in air.

Table 1 collectively shows the results of the heat fusion test of the hot-water treated prepolymer particles and the results where the heat treatment was conducted under the same conditions as in Example 1.

Example 3

Polyester prepolymer particles were obtained in the same manner as in Example 2 except that the conditions in Example 2 were modified as follows: the dicarboxylic acid and diol supplied to the slurry preparation vessel were changed to 12.6 parts by mass of terephthalic acid, 0.473 part by mass of 1,4-cyclohexane dicarboxylic acid and 7.31 parts by mass of ethylene glycol.

The polyester prepolymer particles had the intrinsic viscosity of 0.59 dL/g, the density of 1.34 g/cm$^3$, the glass transition temperature Tg of 70° C., and the average particle size of 2.4 mm.

These prepolymer particles were thrown into hot water heated at 80° C. in a water bath, maintained for 80 seconds under stirring, immediately taken onto a strainer to remove water, and left in air for cooling to conduct a hot-water treatment. No fusion was observed among the hot-water treated prepolymer particles after the cooling in air.

Table 1 collectively shows the results of the heat fusion test of the hot-water treated prepolymer particles and the results where the heat treatment was conducted under the same conditions as in Example 1.

Comparative Example 1

The heat fusion test and the heat treatment were conducted under the same conditions as in Example 1 except that the polyester prepolymer particles obtained in Example 1 were not subjected to the hot-water treatment. Table 1 collectively shows these results.

Since no hot-water treatment was conducted in Comparative Example 1, the thickness of the surface-crystallized layer was as thin as 8 μm and fusion was observed in the heat fusion test.

Comparative Example 2

The heat fusion test and the heat treatment were conducted under the same conditions as in Example 1 except that the polyester prepolymer particles obtained in Example 1 were subjected to the hot-water treatment in which the conditions were changed to those shown in Table 1. Table 1 collectively shows these results.

In Comparative Example 2, since the parameter ((T−Tg)t) corresponding to the total amount of heat given in the hot-water treatment was as large as 12000, fusion was observed in the prepolymer particles after the cooling in air. Furthermore, the thickness of the surface-crystallized layer was as thick as 190 μm, and this resulted in decrease in the solid-phase polycondensation rate, as compared with that in Example 1.

Comparative Example 3

The heat fusion test and the heat treatment were conducted under the same conditions as in Example 1 except that the polyester prepolymer particles obtained in Example 1 were subjected to the hot-water treatment in which the conditions were changed to those shown in Table 1. Table 1 collectively shows these results.

In Comparative Example 3, since the temperature of the hot water in the hot-water treatment was lower than Tg of the polyester prepolymer particles and the thickness of the surface-crystallized layer was as thin as 8 μm, fusion was observed in the heat fusion test.

Comparative Example 4

The polyester prepolymer particles obtained in Example 1 were maintained in steam at 130° C. for 30 minutes, immediately taken onto a strainer to remove water, and subjected to a treatment of leaving at rest and cooling in air. Fusion was observed among the particles after the cooling in air.

Table 1 collectively shows the results of the heat fusion test of the prepolymer particles subjected to this treatment and the results where the heat treatment was conducted under the same conditions as in Example 1.

In Comparative Example 4, since the particles were brought into contact with the steam at the temperature as high as 130° C. in the treatment corresponding to the hot-water treatment, the thickness of the surface-crystallized layer was as thick as 150 μm, and this resulted in decrease in the solid-phase polycondensation rate as compared with that in Example 1.

Comparative Example 5

The heat fusion test and the heat treatment were conducted under the same conditions as in Example 2 except that the polyester prepolymer particles obtained in Example 2 were subjected to the hot-water treatment in which the conditions were changed to those shown in Table 1. Table 1 collectively shows these results.

In Comparative Example 5, since the parameter ((T−Tg)t) corresponding to the total amount of heat given in the hot-water treatment was as large as 21600, the thickness of the surface-crystallized layer was as thick as 210 μm, and this resulted in decrease in the solid-phase polycondensation rate as compared with that in Example 2.

TABLE 1

| | Polyester prepolymer pellets | | | | | Hot-water treatment conditions | | |
|---|---|---|---|---|---|---|---|---|
| | Polycondensation catalyst | Intrinsic viscosity (dl/g) | Density (g/cm³) | Glass transition temperature (Tg) (° C.) | Average particle size (mm) | Temperature (Tt) (° C.) | Time (t) (sec.) | (Tt − Tg) t |
| Ex. 1 | Ge type | 0.64 | 1.34 | 73 | 3.5 | 83 | 30 | 300 |
| Ex. 2 | Ti type | 0.62 | 1.34 | 72 | 3.7 | 83 | 30 | 330 |
| Ex. 3 | Ti type | 0.59 | 1.34 | 70 | 2.4 | 80 | 80 | 800 |
| Comp. Ex. 1 | Ge type | 0.64 | 1.34 | 73 | 3.5 | — | — | — |
| Comp. Ex. 2 | Ge type | 0.64 | 1.34 | 73 | 3.5 | 93 | 600 | 12000 |
| Comp. Ex. 3 | Ge type | 0.64 | 1.34 | 73 | 3.5 | 65 | 300 | −2400 |
| Comp. Ex. 4 | Ge type | 0.64 | 1.34 | 73 | 3.5 | 130 | 30 | 1710 |
| Comp. Ex. 5 | Ti type | 0.62 | 1.34 | 72 | 3.7 | 90 | 1200 | 21600 |

| | Result of fusion test after hot-water treatment | Results of heat fusion test | Polyester resin pellets | | | |
|---|---|---|---|---|---|---|
| | | | Intrinsic viscosity (dl/g) | Thickness of surface-crystallized layer (μm) | Minor axis of pellet (mm) | Haze (%) |
| Ex. 1 | ○ | ○ | 0.83 | 50 | 2.8 | 2.6 |
| Ex. 2 | ○ | ○ | 0.84 | 40 | 2.9 | 2.1 |
| Ex. 3 | ○ | ○ | 0.84 | 90 | 1.6 | 1.3 |
| Comp. Ex. 1 | — | X | 0.85 | 8 | 2.8 | 4.5 |
| Comp. Ex. 2 | X | ○ | 0.69 | 190 | 2.8 | 2.5 |
| Comp. Ex. 3 | ○ | X | 0.84 | 8 | 2.8 | 4.6 |
| Comp. Ex. 4 | X | ○ | 0.72 | 150 | 2.8 | 2.6 |
| Comp. Ex. 5 | X | ○ | 0.72 | 210 | 2.9 | 1.9 |

Example 4

Preparation of Titanium-Magnesium-Phosphorus Type Polycondensation Catalyst 50 g of ethanol (guaranteed reagent, purity: at least 99.6%) was charged into a 300 ml Erlenmeyer flask with a ground glass stopper, then 8.58 g of magnesium acetate-tetrahydrate was added thereto, and the solution was stirred for 20 minutes with a stirrer to dissolve substantially uniformly. Next, 8.41 g of dibutyl phosphate (trade name: DBP, manufactured by Johoku Chemical Co., Ltd.) was added to the solution over 15 minutes, 13.64 g of tetra-n-butoxy titanate was further added over 5 minutes, and the solution was stirred for 10 minutes to obtain a uniform solution. Ethanol was distilled off by means of an evaporator with an oil bath set at 60° C. until the content became 55.61 g. Then, 31.56 g of ethylene glycol was added. Low-boiling products in the ethylene glycol solution were distilled off under a pressure of 1.3 kPaA (A means an absolute pressure) over 40 minutes to obtain 48.62 g of a flowable titanium-magnesium-phosphorus type polycondensation catalyst. A titanium concentration in the polycondensation catalyst was 3.8% by weight as titanium.

Preparation of Polyester Prepolymer Particles

The preparation was carried out by using a PET prepolymer continuous production apparatus equipped with a slurry preparation vessel equipped with a stirrer, a pipe for charging ethylene glycol and a pipe for charging terephthalic acid; pipes for transporting a slurry and esterification reaction products to respective esterification reaction vessels; completely mixing type first and second esterification reaction vessels each equipped with a stirrer, a separating tower, a raw material inlet, a pipe for charging a catalyst and a pipe for transporting reaction products; a pipe for transporting esterification reaction products (oligomers) to a melt polycondensation reaction vessel; a completely mixing type first melt polycondensation reaction vessel equipped with a stirrer, a separating tower, an oligomer inlet and a pipe for charging a catalyst; plug flow type second and third melt polycondensation reaction vessels each equipped with a stirrer, a separating tower, a polymer inlet and a polymer outlet; and a particle forming apparatus (a strand cutter was a pelletizer (P-USG100) manufactured by Rueter Automatic Company) in which a prepolymer was extracted in the form of strands through outlets from a die plate through a gear pump and strand-cut under cooling with water.

With use of the PET prepolymer continuous production apparatus, a dicarboxylic acid and a diol were subjected to an esterification reaction and further to a melt polycondensation reaction, and the resulting PET prepolymer in a molten state was extracted in the form of strands from the die plate and cut, thereby producing polyester prepolymer particles. More specifically, the polyester prepolymer particles were produced as follows.

A terephthalic acid/isophthalic acid/ethylene glycol (at a molar ratio of 0.985:0.015:1.5) slurry was so prepared in the slurry preparation vessel that the slurry contained tetra-n-butyl titanate in an amount of 4 mass ppm as titanium to resultant polyester. Furthermore, 400 parts by mass of bis-(β-hydroxyethyl) terephthalate was charged into the first esterification reaction vessel and dissolved in a nitrogen atmosphere, and the temperature and pressure thereof were maintained at 262° C. and 96 kPaG (G means a relative pressure to the atmospheric pressure), respectively. The slurry prepared in the slurry preparation vessel was continuously charged into the first vessel at a rate of 135 parts by mass/hour so as to achieve an average residence time of 4.5 hours as polyester, and while distilling off produced water from the separating tower, the esterification reaction was conducted and the reaction solution was continuously transported to the second esterification reaction vessel.

In the second esterification reaction vessel, the esterification reaction was conducted under the conditions of a temperature of 260° C., a pressure of 5 kPaG and a residence time of 1.5 hours and the reaction products were continuously transported through the transporting pipe to the completely mixing type melt polycondensation reaction vessel, and at the same time, an ethylene glycol-diluted solution of the titanium-magnesium-phosphorus type polycondensation catalyst (concentration: 0.02% by mass as titanium) prepared above was continuously added to this transporting pipe, in amounts of 4 mass ppm, 2 mass ppm and 2.6 mass ppm as titanium, magnesium and phosphorus, respectively, to the polyester prepolymer obtained.

In the first melt polycondensation reaction vessel, the reaction was conducted at a temperature of 270° C., under a pressure of 4.4 kPaA (A means an absolute pressure), for a residence time of 1.0 hour and the reaction products were continuously transported through the transporting pipe to the second melt polycondensation reaction vessel. In the second melt polycondensation reaction vessel, the reaction was conducted at a temperature of 270° C., under a pressure of 4.4 kPaA, for a residence time of 1.0 hour, and the reaction products were transported through the transporting pipe to the third melt polycondensation reaction vessel. In the third melt polycondensation reaction vessel, the reaction was conducted at a temperature of 270° C., under a pressure of 4.4 kPaA, for a residence time of 0.8 hour.

The molten PET prepolymer thus obtained was directly guided through the gear pump and discharging pipe to the die head, extracted in the form of strands through the die holes, cooled with water, and then pelletized by the pelletizer (P-USG100) manufactured by Rueter Automatic Company. The pelletization was conducted by a strand cut method, and more specifically, while the strand-like PET prepolymer was brought into contact with water to cool, it was transported with water toward the cutter, sandwiched and pulled with a pair of pulling rollers provided in the front of the cutter, and supplied to the cutter. The prepolymer was then cut with the cutter having fixed teeth and rotary teeth, to obtain PET prepolymer particles. Here, the discharging amount of the molten PET prepolymer was 100 kg/hour, the temperature thereof was 270° C., and the prepolymer was discharged in the form of strands in a discharging direction at a downward angle of 45° from the horizontal direction from the die plate having six circular die holes with the diameter of 3 mmφ.

This strand-like PET prepolymer was led through an air-cooling distance of at least 100 mm, brought into water in the water-cooling zone of the strand cutter, transported under cooling with water at 50° C., pulled with the pulling rollers, and supplied to the cutter. The pulling rate of strands was 3.2 m/sec, and the pelletization with the cutter was conducted by controlling a ratio of rotation numbers of the rotary teeth and the pulling rollers so that the length of particles in the pulling direction was 1.25 mm.

As a result, PET prepolymer particles were obtained in an elliptic cylinder shape close to a shape obtained by attaching a semicircular column to each of both ends of a nearly rectangular parallelepiped with a length of 1.25 mm, a width of 1.2 mm and a thickness of 0.9 mm.

The particles had the intrinsic viscosity of 0.29 dL/g, the terminal carboxyl group concentration of 26 eq/ton, the density of 1.34 g/cm$^3$, the glass transition temperature (Tg) of 72° C., the isophthalic acid copolymerization amount of 1.5 mol %, the diethylene glycol copolymerization amount of 2.0 mol % and the average particle size of 1.1 mm.

Hot-Water Treatment

These prepolymer particles were thrown into hot water heated at 83° C. in a water bath, maintained for 30 seconds under stirring, immediately taken onto a strainer to remove water, and left in air for cooling, thereby conducting a hot-water treatment.

The prepolymer particles after the hot-water treatment are called "hot-water treated prepolymer particles".

No fusion was observed among the hot-water treated prepolymer particles after the cooling in air. The heat fusion test was conducted using the hot-water treated prepolymer particles and no fusion was observed.

Crystallization Treatment 30 g of the hot-water treated prepolymer particles were placed and spread in a stainless-steel vat with a bottom surface of 130 mm×170 mm square and a depth of 30 mm, the vat was then put in an inert oven (IPHH-201M type manufactured by Tabai Espec Company), with an internal gas at the temperature of 180° C., and a crystallization treatment was conducted for one hour under the conditions that the flow rate of nitrogen flowing inside the inert oven was 50 NL/min and the temperature was 180° C.

Heat Treatment Apparatus

Figure 3:
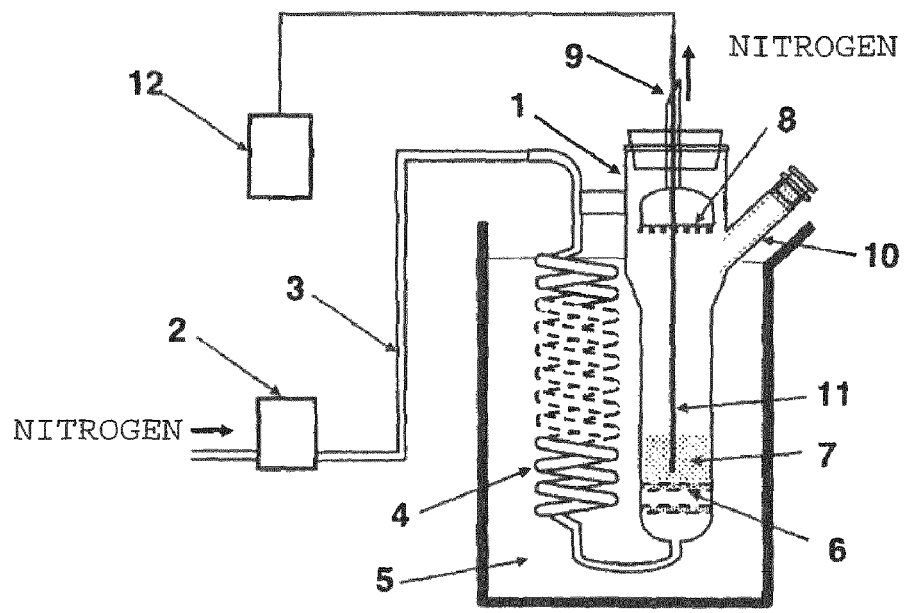
FIG. 3 is a diagram to show a heat treatment apparatus used in the examples and comparative examples.

The sample after the crystallization treatment of the hot-water treated prepolymer particles described above was subjected to a heat treatment using a glass heat treatment apparatus shown in FIG. 3.

The heat treatment apparatus will be explained below.

In the heat treatment apparatus as shown in FIG. 3, the sample was charged into a glass heat treatment tube (1) with a sample charging portion having an inner diameter of 45 mm. Nitrogen is introduced into the heat treatment tube (1) through a gas flowmeter (2), a nitrogen introduction tube (3), and a nitrogen preheating tube (4) while being heated by oil filled in an oil bath (5). Nitrogen introduced is dispersed by a dispersing plate (6) located in the lower part of the heat treatment tube (1), to become an upward flow having a substantially uniform linear velocity in the heat treatment tube (1) and pass through a sample layer (7). Nitrogen passing through the sample layer (7) flows via a filter (8) located in the upper part of the heat treatment tube (1) and is discharged from a gas purge opening (9) to the outside of the heat treatment tube (1). The heat treatment tube (1) has a branched tube (10) and the sample can be introduced or taken out from an opening in the upper part thereof (which is usually closed with a glass stopper). Furthermore, a temperature of the sample in the heat treatment tube (1) can be measured by a thermometer (12) with a thermocouple (11). An internal temperature of the heat treatment tube (1) becomes 2° C. lower than the temperature of the oil in the oil bath, at the temperature and the superficial linear velocities in the range of the present example, and, therefore, the temperature of the oil was controlled 2° C. higher than the aimed temperature for the solid-phase polycondensation.

Solid-Phase Polycondensation Step 30 g of the sample obtained by the crystallization treatment of the hot-water treated prepolymer particles was charged from the opening of the branched tube (10) into the heat treatment tube (1) and nitrogen was made to flow to replace the interior with nitrogen. Then, the nitrogen flow rate was set with the gas flowmeter (2) so that the superficial linear velocity of nitrogen in the heat treatment tube (1) became 0.30 m/sec at 210° C. (the "superficial linear velocity" means a superficial linear velocity in the sample layer (the same also applies below)), and the heat treatment apparatus was immersed in the first oil bath (5) in which the temperature of the oil was controlled at 212° C. This point was regarded as initiation of the solid-phase polycondensation step.

After two hours from the initiation of the solid-phase polycondensation step, the flow rate of nitrogen was changed so that the superficial linear velocity of nitrogen was 1.0 m/sec at 235° C., and then the heat treatment apparatus was moved into the second oil bath (5) in which the temperature of oil was controlled at 237° C.

After passage of ten minutes from the movement of the heat treatment apparatus into the second oil bath (5), the superficial linear velocity of nitrogen was changed so that the flow rate of nitrogen was 0.30 m/sec at 220° C., and the heat treatment apparatus was moved into the third oil bath (5) in which the temperature of the oil was controlled at 222° C.

After passage of 16 hours from the movement of the heat treatment apparatus into the third oil bath (5), the heat treatment tube (1) was picked from the oil bath, cooled to at room temperature, thereby obtaining polyester resin particles. The polyester resin particles had the intrinsic viscosity of 0.78 dL/g, the particle minor diameter of 0.9 mm, the thickness of surface-crystallized layer of 25 μm and the haze of 3.2%.

Table 2 collectively shows these results.

Examples 5 and 6

The polyester prepolymer particles obtained in Example 4 were subjected to the heat fusion test and the heat treatment under the same conditions as in Example 1, except that the hot-water treatment conditions were changed to those as shown in Table 2. Table 2 collectively shows these results.

Examples 7 and 8

The heat fusion test and the heat treatment (crystallization and solid-phase polycondensation) were conducted under the same conditions as in Examples 4 and 5, except that the superficial linear velocity of nitrogen was changed to 0.30 m/sec at 230° C. and the temperature of the oil was changed to 232° C., among the heat treatment conditions in the third oil bath (5) in Examples 4 and 5.

Table 2 collectively shows these results.

Comparative Example 6

The polyester prepolymer particles obtained in Example 4 were subjected to the heat fusion test and the heat treatment under the same conditions as in Example 4, except that no hot-water treatment was conducted. Table 2 collectively shows these results.

In Comparative Example 6, since no hot-water treatment was conducted, the thickness of the surface-crystallized layer was as thin as 6 μm, and fusion was observed in the heat fusion test.

Comparative Example 7

The heat fusion test and the heat treatment (crystallization and solid-phase polycondensation) were conducted under the same conditions as in Example 7, except that no hot-water treatment was conducted. Table 2 collectively shows these results.

In Comparative Example 7, since no hot-water treatment was conducted, the thickness of the surface-crystallized layer was as thin as 5 μm, and fusion was observed in the heat fusion test.

TABLE 2

| | Polyester prepolymer pellets | | | | | Hot-water treatment conditions | | |
|---|---|---|---|---|---|---|---|---|
| | Polycondensation catalyst | Intrinsic viscosity (dl/g) | Density (g/cm$^3$) | Glass transition temperature (Tg) (° C.) | Average particle size (mm) | Temperature (Tt) (° C.) | Time (t) (sec.) | (Tt − Tg) t |
| Ex. 4 | Ti type | 0.29 | 1.34 | 72 | 1.1 | 83 | 30 | 330 |
| Ex. 5 | Ti type | 0.29 | 1.34 | 72 | 1.1 | 83 | 60 | 660 |
| Ex. 6 | Ti type | 0.29 | 1.34 | 72 | 1.1 | 90 | 60 | 1080 |
| Ex. 7 | Ti type | 0.39 | 1.34 | 72 | 1.1 | 83 | 30 | 330 |
| Ex. 8 | Ti type | 0.39 | 1.34 | 72 | 1.1 | 83 | 60 | 660 |
| Comp. Ex. 6 | Ti type | 0.29 | 1.34 | 72 | 1.1 | — | — | — |
| Comp. Ex. 7 | Ti type | 0.39 | 1.34 | 72 | 1.1 | — | — | — |

| | Result of fusion test after hot-water treatment | Results of heat fusion test | Polyester resin pellets | | | |
|---|---|---|---|---|---|---|
| | | | Intrinsic viscosity (dl/g) | Thickness of surface-crystallized layer (μm) | Minor axis of pellet (mm) | Haze (%) |
| Ex. 4 | ○ | ○ | 0.78 | 25 | 0.9 | 3.2 |
| Ex. 5 | ○ | ○ | 0.79 | 35 | 0.9 | 3.3 |
| Ex. 6 | ○ | ○ | 0.79 | 40 | 0.9 | 3.1 |
| Ex. 7 | ○ | ○ | 0.94 | 30 | 0.9 | 2.5 |
| Ex. 8 | ○ | ○ | 0.95 | 30 | 0.9 | 2.4 |
| Comp. Ex. 6 | — | X | 0.76 | 6 | 0.9 | 3.3 |
| Comp. Ex. 7 | — | X | 0.91 | 5 | 0.9 | 2.3 |

Example 11

Preparation of Titanium-Magnesium-Phosphorus Type Polycondensation Catalyst 50 g of ethanol (guaranteed reagent, purity: at least 99.6%) was charged into a 300 ml Erlenmeyer flask with a ground glass stopper, then 8.58 g of magnesium acetate·tetrahydrate was added thereto, and the solution was stirred for 20 minutes with a stirrer to dissolve substantially uniformly. Next, 8.41 g of dibutyl phosphate (trade name: DBP, manufactured by Johoku Chemical Co., Ltd.) was added to the solution over 15 minutes, 13.64 g of tetra-n-butoxy titanate was further added over 5 minutes, and the solution was stirred for 10 minutes to obtain a uniform solution. Ethanol was distilled off by means of an evaporator with an oil bath set at 60° C. until the content became 55.61 g. Then, 31.56 g of ethylene glycol was added. Low-boiling products in the ethylene glycol solution were distilled off under a pressure of 1.3 kPaA (A means an absolute pressure) over 40 minutes to obtain 48.62 g of a flowable titanium-magnesium-phosphorus type polycondensation catalyst. A titanium concentration in the polycondensation catalyst was 3.8% by weight as titanium.

Preparation of Pet Prepolymer Particles (A)

The preparation was carried out by using a PET prepolymer continuous production apparatus equipped with a slurry preparation vessel equipped with a stirrer, a pipe for charging ethylene glycol and a pipe for charging terephthalic acid; pipes for transporting a slurry and esterification reaction products to respective esterification reaction vessels; completely mixing type first and second esterification reaction vessels each equipped with a stirrer, a separating tower, a raw material inlet, a pipe for charging a catalyst and a pipe for transporting reaction products; a pipe for transporting esterification reaction products (oligomers) to a melt polycondensation reaction vessel; a completely mixing type first melt polycondensation reaction vessel equipped with a stirrer, a separating tower, an oligomer inlet and a pipe for charging a catalyst; plug flow type second and third melt polycondensation reaction vessels each equipped with a stirrer, a separating tower, a polymer inlet and a polymer outlet; and a particle forming apparatus (a strand cutter was a pelletizer (P-USG100) manufactured by Rueter Automatic Company) in which a prepolymer was extracted in the form of strands through outlets from a die plate through a gear pump and strand-cut under cooling with water.

With use of the PET prepolymer continuous production apparatus, a dicarboxylic acid and a diol were subjected to an esterification reaction and further to a melt polycondensation reaction, and the resulting PET prepolymer in a molten state was extracted in the form of strands from the die plate and cut, thereby producing PET prepolymer particles. More specifically, the polyester prepolymer particles were produced as follows.

A terephthalic acid/isophthalic acid/ethylene glycol (molar ratio of 0.985:0.015:1.5) slurry was so prepared in the slurry preparation vessel that the slurry contained tetra-n-butyl titanate in an amount of 4 mass ppm as titanium to resultant PET. Furthermore, 400 parts by mass of bis-(β-hydroxyethyl) terephthalate was charged into the first esterification reaction vessel and dissolved in a nitrogen atmosphere, and the temperature and pressure thereat were maintained at 262° C. and 96 kPaG (G means a relative pressure to the atmospheric pressure), respectively. The slurry prepared in the slurry preparation vessel was continuously charged into the first vessel at a rate of 135 parts by mass/hour so as to achieve an average residence time of 4.5 hours as polyester, and while distilling off produced water from the separating tower, the esterification reaction was conducted and the reaction solution was continuously transported to the second esterification reaction vessel.

In the second esterification reaction vessel, the esterification reaction was conducted under the conditions of a temperature of 260° C., a pressure of 5 kPaG and a residence time of 1.5 hours and the reaction products were continuously transported through the transporting pipe to the completely mixing type melt polycondensation reaction vessel, and at the same time, an ethylene glycol-diluted solution of the titanium-magnesium-phosphorus type polycondensation catalyst (concentration: 0.02% by mass as titanium) prepared above was continuously added to this transporting pipe, in amounts of 4 mass ppm, 2 mass ppm and 2.6 mass ppm as titanium, magnesium and phosphorus, respectively, to the polyester prepolymer obtained.

In the first melt polycondensation reaction vessel, the reaction was conducted at a temperature of 270° C., under a pressure of 4.4 kPaA (A means an absolute pressure), for a residence time of 1.0 hour and the reaction products were continuously transported through the transporting pipe to the second melt polycondensation reaction vessel. In the second melt polycondensation reaction vessel, the reaction was conducted at a temperature of 270° C., under a pressure of 4.4 kPaA, for a residence time of 1.0 hour, and the reaction products were transported through the transporting pipe to the third melt polycondensation reaction vessel. In the third melt polycondensation reaction vessel, the reaction was conducted at a temperature of 270° C., under a pressure of 4.4 kPaA, for a residence time of 0.8 hour.

The molten PET prepolymer thus obtained was directly guided through the gear pump and discharging pipe to the die head, extracted in the form of strands through the die holes, cooled with water, and then pelletized by the pelletizer (P-USG100) manufactured by Rueter Automatic Company. The pelletization was conducted by a strand cut method, and more specifically, while the strand-like PET prepolymer was brought into contact with water to cool, it was transported with water toward the cutter, sandwiched and pulled with a pair of pulling rollers provided in the front of the cutter, and supplied to the cutter. The prepolymer was then cut with the cutter having fixed teeth and rotary teeth, to obtain PET prepolymer particles.

Here, the discharging amount of the molten PET prepolymer was 100 kg/hour, the temperature thereof was 270° C., and the prepolymer was discharged in the form of strands in a discharging direction at a downward angle of 45° from the horizontal direction from the die plate having six circular die holes with the diameter of 3 mmφ.

This strand-like PET prepolymer was led through an air-cooling distance of at least 100 mm, brought into water in the water-cooling zone of the strand cutter, transported under cooling with water at 50° C., pulled with the pulling rollers, and supplied to the cutter. The pulling rate of strands was 3.2 m/sec, and the pelletization with the cutter was conducted by controlling a ratio of rotation numbers of the rotary teeth and the pulling rollers so that the length of particles in the pulling direction was 1.25 mm.

As a result, PET prepolymer particles were obtained in an elliptic cylinder shape close to a shape obtained by attaching a semicircular column to each of both ends of a nearly rectangular parallelepiped with a length of 1.25 mm, a width of 1.2 mm and a thickness of 0.9 mm. The particles had the intrinsic viscosity of 0.287 dL/g, the terminal carboxyl group concentration of 26 eq/ton, the isophthalic acid copolymerization amount of 1.5 mol %, the diethylene glycol copolymerization amount of 2.0 mol %, and the average mass of 1.8 mg/particle. The PET prepolymer particles will be referred to hereinafter as "prepolymer particles (A)".

Surface Treatment Step (Hot-Water Treatment Step)

The above-mentioned prepolymer particles (A) (glass transition temperature: 72° C.) were thrown into hot water heated at 90° C. in a water bath, maintained under stirring for 60 seconds, immediately taken onto a strainer, and quickly cooled with ice water. After sufficient cooling, water was removed, thereby completing the hot-water treatment.

Heat Treatment Step

Heat Treatment Apparatus

The sample after the hot-water treatment of the prepolymer particles (A) was subjected to a heat treatment using the glass heat treatment apparatus shown in FIG. 3.

Explanation of the heat treatment apparatus is as described in Example 4.

At the temperatures in the range of the present example, the internal temperature of the heat treatment tube (1) becomes 7° C. lower than the temperature of the oil in the oil bath if the superficial linear velocity is 2.00 m/sec, and, therefore, the temperature of the oil was controlled to be 7° C. higher than the aimed temperature for the solid-phase polycondensation. If the superficial linear velocity is either of 1.0 m/sec and 0.3 m/sec, the internal temperature of the heat treatment tube (1) becomes 2° C. lower than the temperature of the oil in the oil bath; thus the temperature of the oil was controlled to be 2° C. higher than the aimed temperature for the solid-phase polycondensation.

Crystallization Step 30 g of the prepolymer particles (A) after the hot-water treatment was charged from the opening of the branched tube (10) into the heat treatment tube (1) and nitrogen was made to flow to replace the interior with nitrogen. Then, the nitrogen flow rate was set with the gas flowmeter (2) so that the superficial linear velocity of nitrogen in the heat treatment tube (1) became 2.00 m/sec at 180° C. (the "superficial linear velocity" means a superficial linear velocity in the sample layer (the same also applies below)), and the heat treatment apparatus is immersed in the first oil bath (5) in which the temperature of the oil was controlled at 187° C. This point was regarded as initiation of the crystallization step (Tx=180° C.). After five minutes, about 0.3 g of a sample for measurement of an intrinsic viscosity was taken out from the opening of the branched tube (10).

First Solid-Phase Polycondensation Step

After the sample was taken out, the flow rate of nitrogen was changed so that the superficial linear velocity of nitrogen became 0.3 m/sec at 210° C., and the heat treatment apparatus was moved to the second oil bath (5) in which the oil temperature was controlled at 212° C. This point was regarded as initiation of the first solid-phase polycondensation step (T1=212° C.). Since ten minutes were needed for the sample temperature to reach 210° C., the temperature rise from Tx to (Tx+20° C.) was within ten minutes. After two hours from the initiation of the first solid-phase polycondensation step, a sample for measurement of intrinsic viscosity was taken out from the opening of the branched tube (10).

Temperature Rise Step

After the sample was taken out, the flow rate of nitrogen was changed so that the superficial linear velocity of nitrogen became 1.00 m/sec at 235° C. and the heat treatment apparatus was moved to the third oil bath (5) in which the oil temperature was controlled at 237° C. This point was regarded as initiation of the temperature rise step (T2=235° C.). After ten minutes from the initiation of the temperature rise step, a sample for measurement of intrinsic viscosity and a sample for the fusion test were taken out.

Fusion Test

In order to check the fusion property of PET particles during the heat treatment, a fusion test was conducted under a load with a fusion tester shown in FIG. 4, using the PET particles having been subjected to the temperature rise step in Example 1 (which will be referred to hereinafter as "particles (A) after the temperature rise step").

The fusion tester will be explained below.

Figure 4:
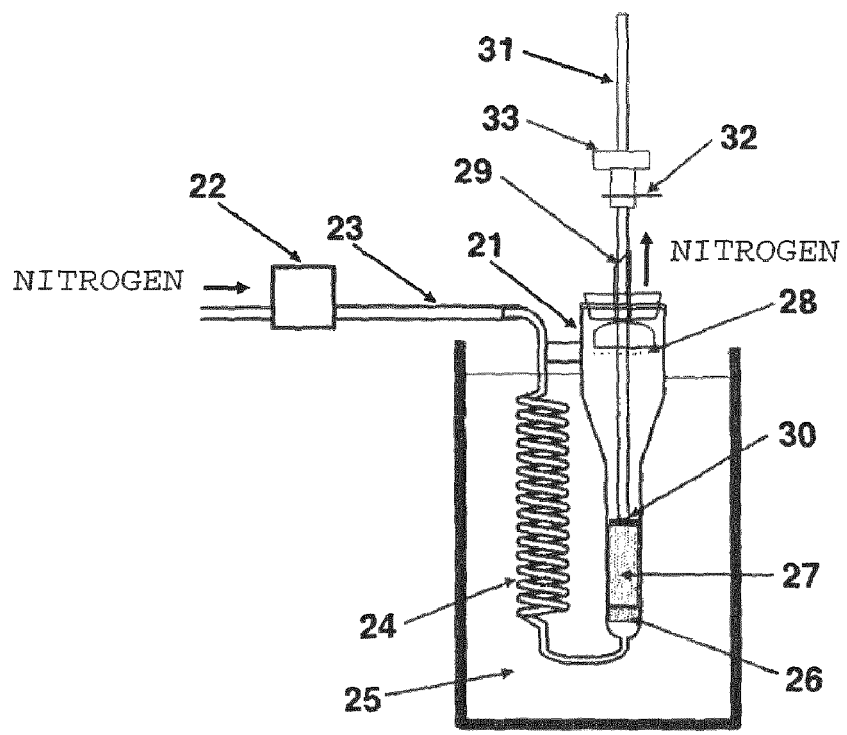
FIG. 4 is a diagram to show a fusion tester used in the examples and comparative examples.

In the fusion tester shown in FIG. 4, the sample was filled in a glass heat treatment tube (21) with a sample filling part having an inner diameter of 14 mm. Nitrogen is introduced through a gas flowmeter (22), a nitrogen introduction tube (23), and a nitrogen preheating tube (24) into the heat treatment tube (21) while being heated by oil filled in an oil bath (25). Nitrogen introduced is dispersed by a dispersing plate (26) located in the lower part of the heat treatment tube (21) to become an upward flow with a substantially uniform linear velocity inside the heat treatment tube (21) and pass through a sample layer (27). Nitrogen passing through the sample layer (27) flows via a filter (28) located in the upper part of the heat treatment tube (21) and is discharged from a gas purge opening (29) to the outside of the heat treatment tube (21). It was preliminarily confirmed that the temperature of the sample inside the heat treatment tube (21) became the same temperature as the oil temperature in the oil bath, by filling another sample in the tube and measuring the temperature thereof with a thermometer equipped with a thermocouple. Furthermore, a stainless-steel hollow support (31) can be mounted through a stainless-steel metallic mesh (30) on the sample layer (27). In addition, a pedestal (33) for mounting of a weight can be fixed with a pin (32) on the support (31) (the mass of the support (31) is 80 g, and the total mass of the pin (32) and the pedestal (33) is 42 g).

8 g of the particles (A) after the temperature rise step were charged as a sample into the heat treatment tube (21), the metallic mesh (30) and support (31) were mounted thereon, and the interior was replaced with nitrogen by nitrogen flow. The nitrogen flow rate was set with the gas flowmeter (22) so that the superficial linear velocity of nitrogen in the heat treatment tube (21) became 0.40 m/sec at 220° C. (the "superficial linear velocity" means a superficial linear velocity in the sample layer (the same also applies below)), and the fusion tester was immersed in the oil bath (25) in which the temperature was controlled at 222° C. This point was regarded as initiation of the fusion test at 220° C. The apparatus was maintained in that state for ten minutes, whereby the temperature of the sample layer became 220° C. No load was placed from the initiation to the point of ten minutes. After that, a weight was put on the pedestal (33) so that the load became 1039 g. After 40 minutes, the fusion tester was picked from the oil bath, the flow of nitrogen was stopped, and the weight (including the support, pin and pedestal) was removed. The sample was pulled out onto a sieve with a mesh of 2.0 mm and softly classified to measure a fusion degree and a fusion rate (mass ratio of the sample on the sieve).

The fusion degree was 0 and the fusion rate was 1.0 mass %, showing the result of excellent resistance to fusion under the load at 220° C.

The evaluation standards of the fusion degree were as follows:
0: no fusion
1: loose (the sample mostly crumbles when pulled out)
2: slightly loose (the sample crumbles when rolled with spatula)
3: slightly tight (the sample crumbles when pushed with spatula)
4: tight (the sample does not crumble even when pushed with spatula)

Example 12

The same operation was conducted as in Example 11, except that the residence time in the crystallization step in Example 11 was changed to 20 minutes. Table 11 shows the results.

Example 13

The same operation was conducted as in Example 11, except that the hot-water treatment step in Example 11 was not conducted. Table 11 shows the results.

Example 14

The same operation was conducted as in Example 12, except that the hot-water treatment step in Example 12 was not conducted. Table 11 shows the results.

Comparative Example 11

The same operation up to the first polycondensation step was conducted as in Example 13, except that the crystallization step in Example 13 was not conducted. A sample for measurement of intrinsic viscosity was tried to taken out from the opening of the branched tube (10) as in Example 13, but no sample was taken out because of fusion of the sample. Table 11 shows the results.

Comparative Example 12

The same operation up to the first polycondensation step was conducted as in Example 13, except that the residence time in the crystallization step in Example 13 was changed to 2 minutes. A sample for measurement of intrinsic viscosity was tried to taken out from the opening of the branched tube (10) as in Example 13, but no sample was taken out because of fusion of the sample. Table 11 shows the results.

Comparative Example 13

The same operation was conducted as in Example 14, except that the residence time in the crystallization step in Example 14 was changed to 60 minutes. Table 11 shows the results.

Comparative Example 14

The same operation as in Example 13 was conducted except that in the first solid-phase polycondensation step in Example 13, the oil temperature was controlled at 182° C., the superficial linear velocity after the movement of the heat treatment apparatus was controlled to 0.3 m/sec, the temperature was immediately raised to 212° C. over 60 minutes, and the temperature was maintained thereat for 60 minutes after the arrival at 212° C. Table 11 shows the results.

TABLE 11

| | Hot-water treatment step* | | | Crystallization step* | | | |
|---|---|---|---|---|---|---|---|
| | Temperature °C. | Reaction time s | IV dL/g | Temperature °C. | Reaction time min | IV dL/g | Fusion degree |
| Ex. 11 | 90 | 60 | 0.29 | 180 | 5 | 0.29 | No fusion |
| Ex. 12 | 90 | 60 | 0.29 | 180 | 20 | 0.29 | No fusion |
| Ex. 13 | — | — | — | 180 | 5 | 0.29 | Fusion in degree of crumbling when loosened |
| Ex. 14 | — | — | — | 180 | 20 | 0.29 | Fusion in degree of crumbling when loosened |
| Comp. Ex. 11 | — | — | — | 180 | 0 | 0.29 | — |
| Comp. Ex. 12 | — | — | — | 180 | 2 | 0.29 | Fusion in degree of crumbling when loosened |
| Comp. Ex. 13 | — | — | — | 180 | 60 | 0.29 | Fusion in degree of crumbling when loosened |
| Comp. Ex. 14 | — | — | — | 180 | 5 | 0.29 | Fusion in degree of crumbling when loosened |

| | First solid-phase polycondensation step* | | | | Temperature rise step* | | | Fusion test | |
|---|---|---|---|---|---|---|---|---|---|
| | Temperature rise time min | Temperature °C. | Reaction time min | IV dL/g | Temperature °C. | Reaction time min | IV dL/g | Temperature °C. | Fusion degree |
| Ex. 11 | 10 | 210 | 120 | 0.384 | 235 | 10 | 0.416 | 220 | 0 |
| Ex. 12 | 10 | 210 | 120 | 0.384 | 235 | 10 | 0.416 | 220 | 1 |
| Ex. 13 | 10 | 210 | 120 | 0.384 | 235 | 10 | 0.416 | 220 | 0 |
| Ex. 14 | 10 | 210 | 120 | 0.384 | 235 | 10 | 0.416 | 220 | 0-1 |
| Comp. Ex. 11 | — | 210 | Fusion | | | | | | |
| Comp. Ex. 12 | 10 | 210 | Fusion | | | | | | |
| Comp. Ex. 13 | 10 | 210 | 120 | 0.384 | 235 | 10 | 0.416 | 220 | 2 |
| Comp. Ex. 14 | 60 | 210 | 60 | 0.361 | 235 | 10 | 0.393 | 220 | 2 |

*The column "IV" in each step indicates an intrinsic viscosity (IV) of PET after the step.

It is understood from the foregoing that, according to the present invention, the fusion of the polyester prepolymer particles is suppressed during the heat treatment such as the crystallization or the solid-phase polycondensation, without reduction in the solid-phase polycondensation rate, and the polyester resin is obtained as one capable of providing a highly transparent molded product by thermoforming.

INDUSTRIAL APPLICABILITY

In the crystallized polyester prepolymer particles of the present invention, fusion at supplying the particles to the heat treatment is suppressed and there is no considerable decrease in the solid-phase polycondensation rate and highly transparent polyester resin molded product can be obtained. Furthermore, the polyester resin obtained by the method of the present invention has high molecular weight and applicable in the wide range of use such as beverage bottles and fibers for industrial use.

The entire disclosures of Japanese Patent Application No. 2006-211120 filed on Aug. 2, 2006 and Japanese Patent Application No. 2007-045772 filed on Feb. 26, 2007 including the specifications, claims, drawings and summaries are incorporated herein by reference in their entireties.

The invention claimed is:

1. A method for producing a polyester resin, comprising carrying out a hot-water treatment and a heat treatment, in this order, of polyester prepolymer particles obtained by melt polycondensation of a dicarboxylic acid component and a diol component, wherein the hot-water treatment comprises bringing the polyester prepolymer particles with an intrinsic viscosity of from at least 0.10 dL/g to at most 1.0 dL/g and with a density of at most 1.36 g/cm$^3$ into contact with hot water having a temperature higher than the glass transition temperature of the polyester prepolymer particles and less than 100° C., under the condition satisfying the following formula (1):

$$40 \leq (T-Tg)t \leq 6000 \qquad (1)$$

wherein t is a hot-water treatment time (second), T is the temperature of the hot water (° C.) and Tg is the glass transition temperature (° C.) of the polyester prepolymer particles wherein the hot-water treatment time t (second) is from 30 to 80 seconds and wherein said polyester resin is a polyethylene terephthalate.

2. The method for producing the polyester resin according to claim 1, wherein the polyester prepolymer particles are those obtained by the melt polycondensation in the presence of a polycondensation catalyst containing a titanium compound and/or a germanium compound.

3. The method for producing the polyester resin according to claim 1, wherein the polyester prepolymer particles are particles with an average particle size of from at least 0.5 mm to at most 10 mm.

4. The method for producing the polyester resin according to claim 1, wherein the heat treatment is conducted at a temperature of from at least 120° C. to at most 245° C.

5. The method for producing the polyester resin according to claim 1, wherein the heat treatment comprises a crystallization step, thereby yielding crystallized polyester prepolymer particles with a surface-crystallized layer having a thickness of from at least 15 μm to at most 110 μm and with an intrinsic viscosity of from at least 0.10 dL/g to at most 1.0 dL/g.

6. The method for producing the polyester resin according to claim 1, wherein the heat treatment comprises a solid-phase polycondensation step, thereby yielding polyester resin particles with a surface-crystallized layer having a thickness of from at least 15 μm to at most 110 μm and with an intrinsic viscosity of from at least 0.60 dL/g to at most 1.5 dL/g.

7. The method for producing the polyester resin according to claim 1, wherein the heat treatment comprises a crystallization step and a solidphase polycondensation step in this order.

8. The method for producing the polyester resin according to claim 7, wherein the crystallization step yields crystallized polyester prepolymer particles with a surface-crystallized layer having a thickness of from at least 15 μm to at most 110 μm and with an intrinsic viscosity of from at least 0.10 dL/g to at most 0.40 dL/g, and wherein the solid-phase polycondensation step yields polyester resin particles with a surface-crystallized layer having a thickness of from at least 15 μm to at most 110 μm and with an intrinsic viscosity of from at least 0.60 dL/g to at most 1.5 dL/g.

9. The method for producing the polyester resin according to claim 8, wherein a terminal carboxyl group concentration of the polyester prepolymer particles is at most 50 eq/ton.

* * * * *